United States Patent
Seybert et al.

(10) Patent No.: US 7,906,214 B2
(45) Date of Patent: *Mar. 15, 2011

(54) OPTICAL ELEMENTS COMPRISING COMPATIBLIZING COATINGS AND METHODS OF MAKING THE SAME

(75) Inventors: Kevin W. Seybert, Pittsburgh, PA (US); Eric M. King, Pittsburgh, PA (US); Anil Kumar, Murrysville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 1042 days.

This patent is subject to a terminal disclaimer.

(21) Appl. No.: 11/627,688

(22) Filed: Jan. 26, 2007

(65) Prior Publication Data

US 2008/0180803 A1    Jul. 31, 2008

(51) Int. Cl.
  *B32B 27/40* (2006.01)
  *B05D 5/06* (2006.01)
(52) U.S. Cl. .................. 428/423.7; 428/480; 359/642; 427/162
(58) Field of Classification Search .................. 428/1.2, 428/423.7, 480; 522/1; 359/642; 427/162
See application file for complete search history.

(56) References Cited

U.S. PATENT DOCUMENTS

| | | |
|---|---|---|
| 4,556,605 A | 12/1985 | Mogami et al. |
| 4,756,973 A | 7/1988 | Sakagami et al. |
| 4,798,745 A | 1/1989 | Martz et al. |
| 4,798,746 A | 1/1989 | Claar et al. |
| 4,889,413 A | 12/1989 | Ormsby et al. |
| 4,974,941 A | 12/1990 | Gibbons et al. |
| 5,178,710 A | 1/1993 | Hikmet et al. |
| 5,239,012 A | 8/1993 | McEntire et al. |
| 5,276,110 A | 1/1994 | Zhou et al. |
| 5,308,535 A | 5/1994 | Scheuble et al. |
| 5,418,301 A | 5/1995 | Hult et al. |
| 5,580,819 A | 12/1996 | Li et al. |
| 5,618,586 A | 4/1997 | Swarup et al. |
| 5,631,051 A | 5/1997 | Ito |
| 5,658,501 A | 8/1997 | Kumar et al. |
| 5,663,247 A | 9/1997 | Sorensen et al. |

(Continued)

FOREIGN PATENT DOCUMENTS

DE     103 43 704 A1    4/2005

(Continued)

OTHER PUBLICATIONS

V.M. Kozenkov et al., "Photoanisotropic Effects in Poly (Vinyl-Cinnamate) Derivatives and their Applications," Mol. Cryst. Liq. Cryst. 409, 2004, 251-267.

(Continued)

*Primary Examiner* — Thao T. Tran
(74) *Attorney, Agent, or Firm* — Deborah M. Altman; Frank P. Malluk

(57) ABSTRACT

The present invention relates to optical elements, such as ophthalmic elements, including a substrate, a compatiblizing coating that optionally includes a dendritic polymer on at least a portion of the surface of the substrate and a functional organic coating, such as, but not limited to, an alignment coating, a photochromic coating, or an aligned liquid crystal coating, in contact with at least a portion of the compatiblizing coating opposite the substrate. The present invention also relates to compatiblizing coating compositions of dendritic polymers that may be used to form compatiblizing coatings on the surface of an optical element, and methods of making optical elements using the compatiblizing coatings.

22 Claims, 3 Drawing Sheets

U.S. PATENT DOCUMENTS

| | | | |
|---|---|---|---|
| 5,744,203 | A | 4/1998 | Harada et al. |
| 5,744,243 | A | 4/1998 | Li et al. |
| 5,760,142 | A | 6/1998 | Klee |
| 5,798,147 | A | 8/1998 | Beck et al. |
| 5,869,191 | A | 2/1999 | Van Gaalen et al. |
| 5,962,617 | A | 10/1999 | Stagel |
| 5,965,761 | A | 10/1999 | Buchecker et al. |
| 5,973,761 | A | 10/1999 | Gofuku et al. |
| 6,025,026 | A | 2/2000 | Smith et al. |
| 6,042,737 | A | 3/2000 | Basil et al. |
| 6,060,001 | A | 5/2000 | Welch et al. |
| 6,068,797 | A | 5/2000 | Hunt |
| 6,150,430 | A | 11/2000 | Walters |
| 6,160,597 | A | 12/2000 | Schadt et al. |
| 6,187,444 | B1 | 2/2001 | Bowles, III et al. |
| 6,225,404 | B1 | 5/2001 | Sorensen et al. |
| 6,268,055 | B1 | 7/2001 | Walters et al. |
| 6,432,544 | B1 | 8/2002 | Stewart et al. |
| 6,436,525 | B1 | 8/2002 | Welch et al. |
| 6,506,488 | B1 | 1/2003 | Stewart et al. |
| 6,531,076 | B2 | 3/2003 | Crano et al. |
| 6,569,956 | B1 | 5/2003 | Ramesh |
| 6,602,603 | B2 | 8/2003 | Welch et al. |
| 6,617,418 | B1 | 9/2003 | Magnusson et al. |
| 6,717,644 | B2 | 4/2004 | Schadt et al. |
| 6,733,887 | B2 | 5/2004 | Okoroafor et al. |
| 6,815,501 | B2 | 11/2004 | Flosbach et al. |
| 6,916,537 | B2 | 7/2005 | Welch et al. |
| 6,930,748 | B2 | 8/2005 | Moon |
| 6,984,262 | B2 | 1/2006 | King et al. |
| 7,044,599 | B2 | 5/2006 | Kumar et al. |
| 7,189,456 | B2 | 3/2007 | King |
| 7,258,437 | B2 * | 8/2007 | King et al. .................. 351/164 |
| 2002/0151652 | A1 | 10/2002 | Adedeji |
| 2003/0165686 | A1 | 9/2003 | Blackburn et al. |
| 2004/0207809 | A1 | 10/2004 | Blackburn et al. |
| 2005/0012998 | A1 | 1/2005 | Kumar et al. |
| 2005/0014004 | A1 | 1/2005 | King et al. |
| 2005/0070621 | A1 | 3/2005 | Kalgutkar |
| 2005/0079293 | A1 | 4/2005 | Baumgart et al. |
| 2005/0196616 | A1 | 9/2005 | Stewart et al. |
| 2005/0196617 | A1 * | 9/2005 | King .............................. 428/412 |
| 2005/0196618 | A1 | 9/2005 | Knox et al. |
| 2005/0196626 | A1 | 9/2005 | Knox et al. |
| 2005/0196696 | A1 | 9/2005 | King |
| 2006/0141171 | A1 | 6/2006 | Tazaki et al. |
| 2006/0210727 | A1 | 9/2006 | Ibuki et al. |
| 2007/0045596 | A1 | 3/2007 | King et al. |

FOREIGN PATENT DOCUMENTS

| | | |
|---|---|---|
| EP | 1 496 087 A1 | 5/2003 |
| EP | 1 593 990 A1 | 5/2004 |
| GB | 2383040 | 6/2003 |
| GB | 2398077 | 8/2004 |
| JP | 57-135919 | 8/1982 |
| JP | 58-072924 | 5/1983 |
| WO | WO 00/64975 | 11/2000 |
| WO | WO 00/77070 | 12/2000 |
| WO | WO 2005/005573 | 1/2005 |
| WO | WO 2005/015298 | 2/2005 |
| WO | WO 2006/008120 A1 | 1/2006 |
| WO | WO 2006/098676 A1 | 9/2006 |

OTHER PUBLICATIONS

B. Pettersson, "Dendritic polyester acrylates cure photoinitiator-free," presented at the 6th Nurnberg Congress, Apr. 2001, available at http://www.coatings.de/radcure/reading/pettersson.htm.

CN2302 Polyester Acrylate Oligomer, technical data sheet.

"The UV & EB Curing Process" RadTech International NA, available at http://www.radtech.org/uv_eb/curing.html.

D. James, Perstorp Specialty Chemicals AB, Sweden, "Performances of an acrylated dendritic polyester in a UV coating formulation," source unknown.

D. James, "Unique Characteristics of a Dendritic Polyether for Radiation Curing," presented at PRA Radcure Coatings and Inks, 24th-25th Jun. 2002, Manchester (UK).

"UV system has sticking power" European Coatings Journal, SICPA Info Centre, Dec. 10, 2004.

D. James, et al., "Hyperbranched Polymers for Hardcoat with Superior Performance," Paint & Coatings Industry, Feb. 28-32, 2006.

Desmodur PL 340, Product Information Sheet, Bayer MaterialScience, Sep. 4, 2002.

* cited by examiner

OPTICAL ELEMENTS COMPRISING COMPATIBLIZING COATINGS AND METHODS OF MAKING THE SAME

BACKGROUND

The present invention generally relates to optical elements, such as ophthalmic elements, comprising a substrate, a compatiblizing coating and a functional organic coating on at least a portion of a surface of the substrate. The present invention also relates to compatiblizing coating compositions that may be used to form compatiblizing coatings on the surface of an optical element, and methods of making optical elements comprising compatiblizing coatings.

Optical elements, such as, for example, ophthalmic elements, may be adapted for use in certain applications by applying one or more functional organic coatings to the element. For example, it is possible to adapt an optical element, such as an ophthalmic element, for use in photochromic eyewear applications by applying a photochromic coating to the surface of the element. Ophthalmic elements with photochromic coatings, such as photochromic lenses for eyewear applications, can provide the wearer with an appropriate level of transmitted radiation depending upon the ambient conditions.

Further, it is possible to adapt an optical element, such as, an ophthalmic element, for use in polarizing applications by forming a polarizing coating that comprises an aligned liquid crystal material and a dichroic dye on the surface of the element. Ophthalmic elements with polarizing coatings, such as polarizing lenses for eyewear applications, can provide the wearer with reduced reflected light glare by linearly polarizing some percentage of the radiation transmitted through the element.

It is also possible to adapt an optical element to display both photochromic and dichroic properties under certain conditions by forming a coating comprising an aligned liquid crystal material and a photochromic-dichroic dye on the surface of the element. Optical elements with photochromic-dichroic coatings may switch from a first state, for example, a clear, non-polarizing state, to a second state, for example, a colored, polarizing state, in response to actinic radiation, and may revert back to the first state in the absence of actinic radiation and in response to thermal energy. For example, ophthalmic elements with photochromic-dichroic coatings, such as lenses for eyewear applications, may transition between a clear, non-polarizing state and a colored, polarizing state to provide the wearer with both an appropriate level of transmitted radiation and reduced reflected light glare depending upon the ambient conditions.

However, if the interaction between the functional organic coating and the surface to which it is applied is insufficient, the functional organic coating (or portions thereof) may not properly adhere to the surface. For example, if a liquid crystal coating (such as those discussed above) and the substrate surface lack sufficient compatibility, the coating may not property adhere to the surface and may be easily removed from the surface, for example, by peeling. In the context of lenses for ophthalmic applications, peeling of the polarizing coating from the surface of the lens will degrade the overall performance of the lens by permitting unpolarized light to pass through those portions of the lens from which the coating has been removed.

It is possible to apply a compatiblizing coating to the surface of a substrate to improve compatibility between the substrate and a photochromic coating applied thereto. However, the compatiblizing coating that is used in conjunction with one coating/surface combination may not provide adequate compatibility between the same surface and a different coating. Thus, different coating/surface combinations may require the use of different compatiblizing coatings.

The need to use different compatiblizing coatings in connection with different coating/surface combinations, however, may lead to, among other things, manufacturing inefficiencies and increased costs. Accordingly, it would be advantageous to develop compatiblizing coatings that may be used to enhance the compatibility of a variety of coating/surface combinations to provide satisfactory compatibility between the coatings and the surfaces.

BRIEF SUMMARY OF THE DISCLOSURE

Various non-limiting embodiments of the present disclosure provide optical elements and methods of forming the optical elements. For example, the present disclosure provides an optical element comprising a substrate, a compatiblizing coating comprising a dendritic polymer on at least a portion of a surface of the substrate; and a functional organic coating, other than an abrasion-resistant coating, in contact with at least a portion of the compatiblizing coating opposite the substrate.

The present disclosure also provides a method of making an optical element. The method comprises forming a compatiblizing coating comprising a dendritic polymer on at least a portion of a surface of a substrate and forming a functional organic coating, other than an abrasion resistant coating, on at least a portion of the compatiblizing coating such that the functional organic coating is in contact with at least a portion of the compatiblizing coating opposite the surface of the substrate.

Further, the present disclosure provides a compatiblizing coating composition. The compatiblizing coating composition comprises a dendritic polymer comprising a terminal functional group, an epoxy-containing material comprising at least two reactive functional groups, at least one of which is an epoxy group, an aminoplast resin comprising at least two reactive groups, a coupling agent, an at least partial hydrolysate thereof, or a mixture thereof, and an initiator, wherein the compatiblizing coating composition is essentially free of photochromic materials.

The present invention also is directed to an optical element comprising a substrate, a compatiblizing coating on at least a portion of a surface of the substrate and a functional organic coating on at least a portion of the compatiblizing coating. The compatiblizing coating is derived from a compatiblizing coating composition as described herein.

Also provided are methods of forming an ophthalmic element comprising forming a compatiblizing coating on at least a portion of a surface of a substrate and forming a functional organic coating on at least a portion of the compatiblizing coating. The compatiblizing coating is derived from a compatiblizing coating composition as described herein.

The present disclosure provides an ophthalmic element comprising an ophthalmic substrate, a compatiblizing coating that is essentially free of photochromic materials on at least a portion of a surface of the ophthalmic substrate, and a functional organic coating, other than an abrasion-resistant coating, in contact with at least a portion of the compatiblizing coating opposite the ophthalmic substrate. The compatiblizing coating is formed from a compatiblizing coating composition comprising an isocyanate-containing material comprising at least two isocyanate groups; a (meth)acrylate-containing material comprising at least two reactive functional groups, at least one of which is a (meth)acrylate group; an aminoplast resin comprising at least two reactive groups; a coupling agent, an at least partial hydrolysate thereof, or a mixture thereof; and at least one of an initiator and a catalyst.

Methods of forming an ophthalmic elements are also disclosed. The methods comprise forming a compatiblizing coating that is essentially free of photochromic materials on at least a portion of a surface of an ophthalmic substrate, at least partially setting at least a portion of the compatiblizing coating by exposing the at least a portion to at least one of UV radiation, electron beam radiation, and thermal radiation, and forming a functional organic coating, other than a hard coating, on at least a portion of the compatiblizing coating. The compatiblizing coating is derived from a compatiblizing coating composition as described herein.

BRIEF DESCRIPTION OF THE SEVERAL VIEWS OF THE DRAWINGS

Aspects of the present invention will be better understood when read in conjunction with the figures, in which.

DESCRIPTION OF VARIOUS NON-LIMITING EMBODIMENTS

Figure 1:
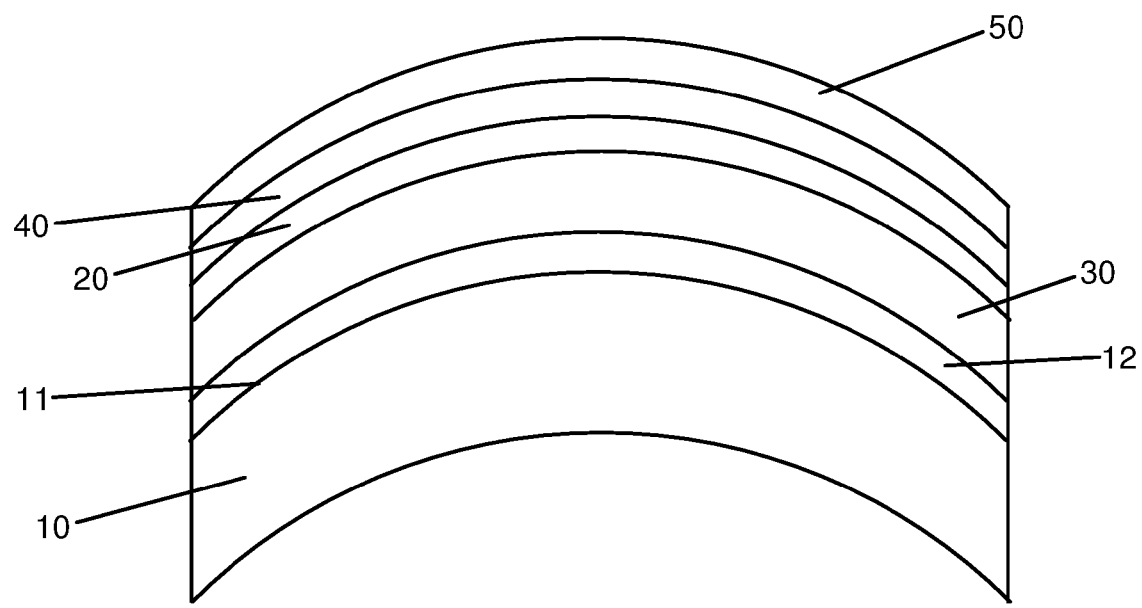
FIGS. 1-3 are schematic, cross-sectional drawings of optical elements according to the present invention.

It is to be understood that while the present invention is described herein in connection with certain embodiments and examples, the present invention is not limited to the particular embodiments and examples disclosed, but is intended to cover modifications that are within the spirit and scope of the invention, as defined by the appended claims. Further, it is to be understood that the present description illustrates aspects of the invention relevant to a clear understanding of the invention. Accordingly, certain aspects of the invention that would be apparent to those of ordinary skill in the art and that, therefore, would not facilitate a better understanding of the invention have not been presented in order to simplify the present description.

As used in this specification and the appended claims, the articles "a," "an," and "the" include plural referents unless expressly and unequivocally limited to one referent. Additionally, for the purposes of this specification, unless otherwise indicated, all numbers expressing quantities, such as weight percentages and processing parameters, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from, for example, the measurement equipment and/or measurement technique. Furthermore, when numerical ranges are set forth herein, these ranges are inclusive of the recited range end point(s).

Moreover, it should be appreciated that where listings of possible substituent groups are provided herein using headings or subheadings, such as, for example: (a), (b) . . . ; (1), (2) . . . ; (i), (ii) . . . ; etc., these headings or subheadings are provided only for convenience of reading and are not intended to limit the choice of substituent groups.

As discussed above, the present invention relates to optical elements, and in particular, to optical elements comprising a substrate, a compatiblizing coating on at least a portion of a surface of the substrate and a functional organic coating, other than an abrasion-resistant coating, in contact with at least a portion of the compatiblizing coating opposite the substrate. That is, the compatiblizing coating is between the substrate and the functional organic coating.

As used herein, the term "optical" means pertaining to or associated with light and/or vision. Non-limiting examples of optical elements include ophthalmic elements, display elements, windows, mirrors, and active and passive liquid crystal cells. As used herein, the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect or enhance (cosmetically or otherwise) vision, including without limitation, contact lenses, intra-ocular lenses, magnifying lenses and protective lenses or visors.

As used herein, the term "display" means the visible or machine-readable representation of information in words, numbers, symbols, designs or drawings. Non-limiting examples of display elements include screens, monitors and security elements, such as security marks. As used herein, the term "window" means an aperture adapted to permit the transmission of radiation therethrough. Non-limiting examples of windows include automotive and aircraft transparencies, filters, shutters and optical switches. As used herein, the term "mirror" means a surface that specularly reflects a large fraction of incident light. As used herein, the term "liquid crystal cell" refers to a structure containing a liquid crystal material that is capable of being ordered. In a typical liquid crystal cell, a liquid crystal material is contained between two substrates that are sealed together to form a chamber. Active liquid crystal cells are cells wherein a liquid crystal material is capable of being switched between ordered and disordered states or between two ordered states by the application of an external force, such as an electric or a magnetic field. Passive liquid crystal cells are cells wherein the liquid crystal material maintains an ordered state. One non-limiting example of an active liquid crystal cell element is a liquid crystal display.

Substrates that are suitable for use in conjunction with various non-limiting embodiments of the present invention disclosed herein include, but are not limited to, substrates formed from organic materials, inorganic materials or combinations thereof, e.g., composite materials. Further, the substrates disclosed herein may have any suitable shape, including but not limited to, planar, cylindrical, spherical, plano-concave (i.e., flat on one side and concave on the other) and plano-convex (i.e., flat on one side and convex on the other). For example, the substrate may be a plano-convex or plano-concave ophthalmic lens having one flat surface and one curved (convex or concave) surface that has a curvature corresponding to any of the various base curves used for ophthalmic lenses. Specific non-limiting examples of materials from which the substrates be formed are described in more detail below.

Non-limiting examples of organic materials that may be used to form the substrates disclosed herein include polymeric materials, for example, homopolymers and copolymers, prepared from the monomers and mixtures of monomers disclosed in U.S. Pat. No. 5,962,617, from col. 2, line 9 to col. 7 to line 46, and in U.S. Pat. No. 5,658,501 from col. 15, line 28 to col. 16, line 17, which disclosures are specifically incorporated herein by reference. Such organic materials may be thermoplastic or thermoset polymeric materials, may be transparent or optically clear, and may have any refractive index required. For example, although not limiting herein, the refractive index of transparent or optically clear organic polymeric materials from which ophthalmic lenses may be formed typically ranges from 1.48 to 1.74.

Specific, non-limiting examples of monomers and polymers that may be used to form the substrates of the optical elements disclosed herein can include: polyol(allyl carbonate) monomers, e.g., allyl diglycol carbonates such as diethylene glycol bis(allyl carbonate), which monomer is sold under the trademark CR-39™ by PPG Industries, Inc., Pittsburgh, Pa.; polyurea-polyurethane (polyurea-urethane) polymers, which are prepared, for example, by the reaction of a polyurethane prepolymer and a diamine curing agent, a composition for one such polymer being sold under the trademark TRIVEX™ by PPG Industries Ohio, Inc., Cleveland, Ohio; acrylic functional monomers, such as but not limited to, polyol(meth)acryloyl terminated carbonate monomer, diethylene glycol dimethacrylate monomers, ethoxylated phenol methacrylate monomers, ethoxylated trimethylol propane triacrylate monomers, ethylene glycol bismethacrylate monomers, poly(ethylene glycol)bismethacryate monomers, urethane acrylate monomers, and poly(ethoxylated bisphenol A dimethacrylate) monomers; diisopropenyl benzene monomers; poly(vinyl acetate); poly(vinyl alcohol); poly(vinyl chloride); poly(vinylidene chloride); polyethylene; polypropylene; polyurethanes; polythiourethanes, which include but are not limited to materials such as the optical resins designated MR-6, MR-7, and MR-8 from Mitsui Toatsu Chemicals, Inc.; thermoplastic polycarbonates, such as the carbonate-linked resin derived from bisphenol A and phosgene, one such material being sold under the trademark LEXAN®; polyesters, such as the material sold under the trademark MYLAR® poly(ethylene terephthalate); polyvinyl butyral; norbonene homopolymers and copolymers, such as those materials sold under the trademark ARTON® from JSR Corp, Saitama, Japan; (poly(methyl methacrylate), such as the material sold under the trademark PLEXIGLAS®, and polymers prepared by reacting polyfunctional isocyanates with polythiols or polyepisulfide monomers, either homopolymerized or co- and/or terpolymerized with polythiols, polyisocyanates, polyisothiocyanates, and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

As previously mentioned, the substrate may be an ophthalmic substrate. As used herein, the term "ophthalmic substrate" refers to lenses, partially formed lenses, and lens blanks. Non-limiting examples of organic materials from which ophthalmic substrates according to various non-limiting embodiments disclosed herein may be formed include, but are not limited to, art-recognized polymers that are useful in forming transparent or optically clear castings for optical applications.

Other non-limiting examples of organic materials suitable for use in forming the substrates disclosed herein can include both synthetic and natural organic materials, including without limitation: opaque or translucent polymeric materials, natural and synthetic textiles, and cellulosic materials. Non-limiting examples of inorganic materials suitable for use in forming substrates that may be used in conjunction with various non-limiting embodiments disclosed herein include inorganic oxide-based glasses, minerals, ceramics, and metals. For example, the substrate may comprise an inorganic oxide-based glass. Also, the substrate may comprise a ceramic, metal, or mineral substrate, which may optionally be polished on at least one side to form a reflective surface. Where it is desired to have a reflective substrate surface, a reflective coating or layer may be deposited or otherwise applied to a surface of an inorganic or an organic substrate to make it reflective or to enhance its reflectivity.

Further, the substrates may be untinted, tinted, and/or photochromic. As used herein, the term "untinted substrate(s)" means substrates that are essentially free of coloring agent additions (such as, but not limited to, conventional dyes). As is used herein, the term "actinic radiation" means electromagnetic radiation, such as, but not limited to, ultraviolet and visible radiation, that is capable of causing a response. Further, the term "tinted substrate(s)" means substrates that have a coloring agent addition (such as, but not limited to, conventional dyes), wherein the coloring agent has absorption spectrum for visible radiation that does not vary significantly in response to actinic radiation. As used herein, the term "photochromic substrate(s)" means substrates that have a photochromic material addition. Further, the substrates according to various non-limiting embodiments disclosed herein may be both tinted and photochromic, i.e., the substrates may comprise both a conventional dye coloring agent (that has an absorption spectrum for visible radiation that does not vary significantly in response to actinic radiation) and a photochromic material.

Still further, the substrates of the optical elements may have a protective coating, such as, but not limited to, an abrasion-resistant coating (also referred to as a "hard coat") on one or more of their surfaces. For example, commercially available thermoplastic polycarbonate ophthalmic lens substrates are often sold with an abrasion-resistant coating applied to their surfaces, because the surfaces of these substrates tend to be readily scratched, abraded or scuffed. An example of one such polycarbonate lens substrate is sold under the trademark GENTEX® (by Gentex Optics, Inc., Dudley, Mass.).

As used herein, the term "protective coating" refers to a coating, such as transitional coatings, abrasion-resistant coatings (or hard coats), oxygen barrier coatings, and UV-shielding coatings. Non-limiting examples of abrasion-resistant coatings include, abrasion-resistant coatings comprising silanes, abrasion-resistant coatings comprising radiation-cured acrylate-based thin films, abrasion-resistant coatings based on inorganic materials, such as, silica, titania, and/or zirconia, and combinations of these coatings. For example, the protective coating may comprise a first coating of a radiation-cured acrylate-based thin film and a second coating comprising a silane. Non-limiting examples of commercial protective coatings products include SILVUE® 124 and HI-GARD® coatings, available from SDC Coatings, Inc. and PPG Industries, Inc., respectively.

While not limiting herein, it has been observed by the inventors hereof that some functional organic coatings, for example, alignment coatings comprising photo-orientation materials (such as, polyvinyl cinnamates) and coatings comprising liquid crystal materials (i.e., liquid crystal coatings), may have a lower than desired adhesion to organic substrate surfaces, and in particular, to organic substrate surfaces having an abrasion-resistant coatings thereon. It also has been observed that the compatiblizing coatings of the present invention may be useful in improving and/or enhancing the adhesion of functional coatings, such as, for example, alignment coatings and liquid crystal coatings to ophthalmic substrates, and in particular, to ophthalmic substrates having hard coated surfaces. Thus, the optical elements of the present invention may comprise a substrate comprising an abrasion-resistant coating in contact with at least a portion of a surface thereof, and the compatiblizing coating may be in contact with at least a portion of the abrasion-resistant coating on the surface of the substrate to improve or enhance the adhesion between the abrasion-resistant coating on the substrate and the functional organic coating applied thereon.

As previously discussed, the present invention relates to optical elements comprising a substrate, a compatiblizing coating on at least a portion of a surface of the substrate and a functional organic coating, other than an abrasion-resistant coating, in contact with at least a portion of the compatiblizing coating opposite the substrate. As used herein, the term "coating" means a structure comprising one or more complete or partial layers derived from flowable compositions, and which may or may not have a uniform composition and/or cross-sectional thickness. As used herein, the term "compatiblizing coating" refers to a coating that improves compatibility between a surface and another coating applied thereon and/or facilitates the formation or application of other coatings on the surface. For example, a compatiblizing coating may be applied to a surface, for example the surface of a substrate or the surface of another coating, to improve one or more of the wetting, chemical compatibility, and adhesion of another coating with the surface.

Further, as used herein in the context of a coating being 'on' a surface or an object, the term "on" means that the subject coating is connected to the surface or object such that the subject coating is supported or carried by the surface or object. Further, as used herein, the term "connected to" means associated with, either directly or indirectly through another material or structure. Thus, for example, a coating that is "on" a surface may be applied directly over the surface or it may be applied over one or more other coatings, at least one of which is applied directly over the surface.

The compatiblizing coating that is on at least a portion of the surface of the substrate comprises a dendritic polymer. As used herein, the term "dendritic polymer" refers to a three-dimensional macromolecular material comprising a polyvalent core that is covalently bonded to a plurality of dendrons (or tree-like structures). The term "dendron" means a tree-like structure having multiple branching layers (or "generations") that emanates from a focal point, such as a polyvalent core. Each succeeding branching layer or generation of a dendron extends from the prior generation, and each branching layer or generation in the dendron has one or more terminal reactive sites (or "terminal functional groups") from which the succeeding generation (if any) may extend, or in the case of the last generation, which may provide a terminal functional group on the dendritic polymer. Dendritic polymers generally have a large number of terminal functional groups, lack entanglements, and have a low hydrodynamic volume. Further, as used herein, the term "dendritic polymers" includes both "dendrimers" and "hyperbranched polymers". As used herein, the term "dendrimer" refers to a dendritic polymer having a symmetrical globular shaped that results from a controlled process giving an essentially monodisperse molecular weight distribution. As used herein, the term "hyperbranched polymer" refers to a dendritic polymer having a certain degree of asymmetry and a polydisperse molecular weight distribution.

Although not limiting herein, the dendritic polymers may be formed, for example, by the step-wise formation of dendrons on a polyvalent core. For example, although not limiting herein, a polyester-type dendritic polymer may be formed by reacting a polyol core with a first chain extender, such as, but not limited to, a carboxylic acid comprising two or more hydroxyl groups, under typical esterification conditions to form a core with several dendrons comprising a first branching layer (or generation) attached thereto. The dendrons will each comprise a number of terminal functional groups (e.g., in the present example, terminal hydroxyl groups), which are located at the periphery of the first branching layer. These terminal functional groups may be further reacted with another first chain extender to produce a second branching layer on the core. The continued replication of branching layers by reacting the terminal functional groups at the periphery of the last formed branching layer with additional first chain extenders will build up the dendrons and will normally yield an increase in the number of terminal functional groups (e.g., in the present example, terminal hydroxyl groups) on the dendritic polymer. After the final branching layer is added to the dendritic polymer, any remaining terminal functional groups (e.g., in the present example, any remaining terminal hydroxyl groups) in the final branching layer of the dendritic polymer may form the terminal functional groups of the dendritic polymer; may be further chain extended, for example by alkoxylation; may be terminated, for example by reaction with a chain stopper; or may be functionalized by reaction with another material to provide a different terminal functional group on the dendritic polymer. As used herein, the term "chain stopper" includes chain extenders which lack the appropriate functional groups to react with a subsequent chain extending group.

One non-limiting example of a stepwise method of forming a polyester-type dendritic polymer on a polyvalent core is described in U.S. Pat. No. 5,418,301 ("the '301 patent") at col. 6, lines 1 through 60. The '301 patent also provides several examples of polyvalent cores suitable for use in forming polyester-type dendritic polymers at col. 2, line 45 to col. 3, line 68; several examples of chain extenders suitable for use in forming polyester-type dendritic polymers at col. 4, lines 1 though 55, and several examples of chain stoppers suitable for use in forming polyester-type dendritic polymers at col. 4, line 56 to col. 5, line 68. The aforementioned portions of the disclosure of the '301 patent are specifically incorporated herein by reference to the extent that the incorporated disclosure does not conflict with the terms and definitions provided herein.

Further, during the step-wise process described above, after formation of any branching layer (i.e., the first branching layer, the second branching layer, etc.), an intermediate substituent (which may also be referred to as a "spacing chain extender") that is different from the first chain extender (for example, although not limiting herein, a different poly-functional carboxylic acid or anhydride, containing reactive terminal functionality), may be reacted with the terminal hydroxyl groups of the last formed branching layer. Thereafter, terminal functional groups of the intermediate substituent may be reacted with a second chain extender, which may be different from both the first chain extender and the spacing chain extender, to provide a dendritic polymer having a desired structure and functionality. One non-limiting example of such a method of forming a polyester-type dendritic polymer is set forth in U.S. Pat. No. 6,569,956 at col. 3, line 33 to col. 4, line 42, which disclosure is specifically incorporated herein by reference to the extent that the incorporated disclosure does not conflict with the terms and definitions provided herein. Another non-limiting example of a method of forming a polyester-type dendritic polymer is set forth in U.S. Pat. No. 5,663,247 at col. 7, line 52 to col. 8, line 38, which disclosure is specifically incorporated herein by reference to the extent that the incorporated disclosure does not conflict with the terms and definitions provided herein.

Alternatively, the dendritic polymers, may be formed by pre-producing dendrons and subsequently attaching the dendrons to a polyvalent core. For example, a polyester-type dendritic polymer may be formed by condensing one or more hydroxy functional carboxylic acids at normal esterification temperatures, by allowing mono-, di-, tri- or poly-functional carboxylic acids to form ester links with mono-, di-, tri- or poly-functional alcohols or epoxides, or by similar procedures resulting in ester links, ether links or other chemical bonds, to form dendrons. The raw materials used to produce the dendrons may be chosen to provide each dendron with a functional group at its focal point, which focal point functional group may be reacted with a polyvalent core to attach the dendron to the core, and a plurality of terminal functional groups at the periphery of the dendron. One non-limiting example of such a method of forming a polyester-type dendritic polymer is set forth in U.S. Pat. No. 5,663,247 ("the '247 patent") at col. 7 lines 23 though 51, and col. 8, lines 1 through 38, which disclosure is specifically incorporated herein by reference to the extent that the incorporated disclosure does not conflict with the terms and definitions provided herein.

As indicated above, polyester-type dendritic polymers may be built up from ester or polyester units, optionally in combination with ether or polyether units. For example, the dendritic polymer of the compatiblizing coating may be a polyester-type dendritic polymer that comprises a monomeric or polymeric core having at least one reactive epoxide, hydroxyl, carboxyl or anhydride group, to which 1 to 100, and more commonly 1 to 20, e.g., 2 to 8, branching layers may be added. The branching layers may be formed from monomeric or polymeric branching chain extenders having at least three reactive groups, of which generally at least one is a hydroxyl group and at least one is a carboxyl, anhydride or epoxide group. As previously discussed, the polyester-type dendritic polymers optionally may also contain at least one spacing chain extender, which may be a compound having two reactive groups. For example, the spacing chain extender may comprise one hydroxyl group, and one carboxyl or anhydride group, or an inner ester, such as a lactone, of such a compound. Further, as previously discussed, the polyester-type dendritic polymer may also comprise a terminal functional group, such as for example, hydroxyl, carboxyl or anhydride groups, and/or the dendritic polymer may be optionally completely or partly chain terminated by at least one monomeric or polymeric chain stopper and/or functionalized with a different functional group.

As discussed above, the '301 patent provides several examples of polyvalent cores suitable for use in forming polyester-type dendritic polymers at col. 2, line 45 to col. 3, line 68; several examples of chain extenders suitable for use in forming polyester-type dendritic polymers at col. 4, lines 1 though 55, and several examples of chain stoppers suitable for use in forming polyester-type dendritic polymers at col. 4, line 56 to col. 5, line 68. Additional non-limiting examples of polyvalent cores that may be used in forming polyester-type dendritic polymers are disclosed in the '247 patent at col. 3, line 22 to col. 4, line 45. Additional non-limiting examples of chain extenders that may be used in forming polyester-type dendritic polymers are disclosed in the '247 patent at col. 4, line 45 to col. 5, line 7. Additional non-limiting examples of chain stoppers that may be used in forming polyester-type dendritic polymers are disclosed in the '247 patent at col. 5, line 33 to col. 6, line 60. Non-limiting examples of spacing chain extenders that may be used in forming polyester-type dendritic polymers are disclosed in the '247 patent at col. 5, lines 7 to 32. The aforementioned portions of the disclosures of the '301 patent and the '247 patent are specifically incorporated herein by reference to the extent that the incorporated disclosure does not conflict with the terms and definitions provided herein.

The dendritic polymer of the compatiblizing coating may be a polyester-type dendritic polymer that is at least one of a hyperbranched polyester oligomer and a hyperbranched polyester acrylate oligomer. Non-limiting examples of commercially available polyester-type dendritic polymers that may be used can include polyester-type dendritic polymers that are from Perstorp Specialty Chemicals, Perstorp, Sweden under the trademark BOLTORN® and designated as H20, H30, and H40 dendritic macromolecules, which comprise terminal hydroxy groups. According to the manufacturer, these materials generally have a weight average molecular weight in the range of 1,000 amu to 4000 amu, and the H20, H30 and H40 materials have on average 16, 32 and 64 terminal hydroxy groups, respectively. Another non-limiting example of a useful commercially available polyester-type dendritic polymer is a polyester acrylate oligomer available from Sartomer Company of Exton, Pa., which is designated CN2302, and which comprise terminal acrylate groups. Another non-limiting example of a useful dendritic polymer is a polyester-polyether blended dendritic polymer, such as those that are available from Perstorp Specialty Chemicals, Perstorp, Sweden under the trademark BOLTORN® and designated as P500.

Other non-limiting examples of dendritic polymers that may be used in the compatiblizing coatings can include, polyester-polyether blended dendritic polymers, epoxide-amine dendritic polymers, carbosilane-based dendritic polymers, amido amine dendritic polymers, polysulfide dendritic polymers, polysiloxane dendritic polymers, polyaminosulfide dendritic polymers, polyether dendritic polymers, polythioether dendritic polymers, polyester dendritic polymers, polyester amide dendritic polymers, poly(ether ketone) dendritic polymers, and the like. Further, as discussed above, such materials can be functionalized, for example, by reaction with acrylating agents to provide terminal acrylic groups or terminated using an appropriate chain stopper.

Further the dendritic polymer of the compatiblizing coating may be an amido amine dendritic polymer, which may also be referred to as a polyamidoamine dense star polymer. See, for example, U.S. Pat. No. 4,558,120 ("the '120 patent"). Amido amine dendritic polymers may be represented by the formula recited in col. 7, lines 10-15 of the '120 patent. A description of amido amine dendritic polymers and their preparation can be found in col. 2, line 39 through col. 9, line 18 of the '120 patent, which description is incorporated by reference to the extent that the incorporated disclosure does not conflict with the terms and definitions provided herein.

The dendritic polymer of the compatiblizing coating may be an epoxide-amine dendritic polymer. Epoxide-amine dendritic polymer may be prepared by the repetitive reaction sequence of (a) the conversion of moieties that are suitable for generation of primary amino groups; (b) a ring opening addition reaction of the primary amino moieties generated in (a) and the epoxide of the branching molecules having one epoxide moiety and having at least one moiety which is suitable for generation of at least a primary amino group; and (c) a terminating reaction which is characterized by the addition reaction of at least a substituted or unsubstituted acrylate onto the amino functions of the dendritic polymer. The terminating reaction may be performed by the use of 2,3-epoxypropyl(meth)acrylate. Non-limiting examples of epoxide-amine dendritic polymer are described in U.S. Pat. No. 5,760,142 ("the '142 patent"). The description found in col. 1, line 65 through col. 3, line 56 of the '142 patent is incorporated by reference to the extent that the incorporated disclosure does not conflict with the terms and definitions provided herein.

The dendritic polymer of the compatiblizing coating also may be a carbosilane-based dendritic polymer. Carbosilane-based dendritic polymers can comprise a carbosilane core having (a) a central silane nucleus; (b) multiple dendrons comprising carbosilane branching layers extending outwardly from the central silane nucleus, with the peripheral branching layer having terminal silane groups; and (c) arms of addition polymer chains emanating out from core peripheral silane termini. Non-limiting examples of carbosilane dendritic polymers are described in U.S. Pat. No. 5,276,110, particularly at col. 1, line 58 to col. 5, line 5, which description is incorporated by reference to the extent that the incorporated disclosure does not conflict with the terms and definitions provided herein.

Additionally, the dendritic polymer of the compatiblizing coating may be a dendritic polymer that is prepared by the polycondensation of cyclic anhydrides with diisopropanol amine. Non-limiting examples of such dendritic polymers are commercially available under the trademark HYBRANE™ from DSM N.V., and are prepared with acrylate and methacrylate ester functional groups. One specific, non-limiting example of such a dendritic polymer is the commercially available HYBRANE™ H1500 dendritic polymer (unmodified).

The dendritic polymer of the compatiblizing coating also may be a polysiloxane dendritic polymer, which may be prepared, for example and without limitation, by an iterative silane hydroxylation and chloride displacement at the silicon atom. The preparation of specific polysiloxane dendritic polymers is described by Uchida et al., *J. Am. Chem. Soc.*, 1990, 112, 7077-7079, which description is specifically incorporated by reference to the extent that the incorporated disclosure does not conflict with the terms and definitions provided herein. See also, col. 5, line 60 through col. 6, line 13 of U.S. Pat. No. 6,889,735, which disclosure is specifically incorporated by reference to the extent that the incorporated disclosure does not conflict with the terms and definitions provided herein.

As previously discussed, the terminal functional groups of the last formed branching layer of a dendritic polymer optionally may be functionalized, i.e., reacted to provide the dendritic polymer with different terminal functional groups. For example, polyester-type dendritic polymers comprising terminal hydroxyl groups may be acrylated to provide an acrylate functional group at the periphery of the dendritic polymer. For example, although not limiting herein, acrylation of the polyester-type dendritic polymers, and recovery and purification of the acrylated dendritic polymer, may be performed using methods well known from the literature, as for instance the methods described in the article "Acrylic Ester Polymers," which is found in the Kirk-Othmer Encyclopedia of Chemical Technology (1980, Vol. 1, pages 386-413). As will be appreciated by those skilled in the art, acrylation is generally a direct reaction, such as esterification, of the molecule to be acrylated with, for example, acrylic acid, methacrylic acid, or crotonic acid (β-methacrylic acid), condensation with an isocyanato(meth)acrylate, or a direct reaction with an anhydride and/or an acyl halide corresponding to the acrylic acid, methacrylic acid, or crotonic acid, usually at a molar ratio of hydroxyl groups to said acid, anhydride and/or acyl halide of generally between 1:0.1 and 1:5, more usually between 1:0.5 and 1:1.5. Other non-limiting examples of acrylating agents include epoxide or anhydride functional acrylates and methacrylates, such as, glycidylmethacrylate. As will be appreciated by those skilled in the art, typically the acrylating agent is used in a stoichiometric molar excess.

The percent of the terminal functional groups on the dendritic polymer that may be functionalized, for example, by acrylation to provide terminal acrylate groups, may vary. For example, according to various non-limiting embodiments disclosed herein, from about 1 to 100% of the terminal functional groups of the dendritic polymer of the compatiblizing coating may be functionalized. The percent of terminal acrylate groups in an acrylated (i.e., functionalized) polyester-type dendritic polymer may vary from 1 to 100%, e.g., from 20 to 100%, or from 40 to 100%, such as from 45 to 100%, and may further range between any combination of these percentages, inclusive of the recited percentages.

The dendritic polymers of the compatiblizing coating may be polyester-type dendritic polymers comprising terminal hydroxyl groups (such as those described above), or one or more of the terminal hydroxyl groups may be functionalized to provide the dendritic polymer with one or more different terminal functional groups. For example, as discussed above, the hydroxyl groups of a polyester-type dendritic polymer may be functionalized to provide one or more terminal acrylate groups.

The dendritic polymers of the compatiblizing coating may comprise a terminal functional group that is at least one of hydroxyl, acrylate, acid, isocyanate, thiol, amine, epoxy, silane, and glycidyl. Further, the dendritic polymers according to various non-limiting embodiments disclosed herein may comprise at least two different functional groups that are independently hydroxyl, acrylate, acid, isocyanate, thiol, amine, epoxy, silane, or glycidyl. Those skilled in the art will readily appreciate methods of functionalizing dendritic polymers, such as the polyester-type dendritic polymers discussed above, to incorporate one or more of the terminal functional groups discussed above.

The compatiblizing coating comprising the dendritic polymer may be formed from a compatiblizing coating composition comprising a dendritic polymer comprising a terminal functional group, wherein the a terminal functional group is at least one of hydroxyl, acrylate, methacrylate, acid, isocyanate, thiol, amine, epoxy, silane, and glycidyl. Non-limiting examples of dendritic polymer comprising a terminal functional group and methods of making the same are discussed above.

In addition to a dendritic polymers discussed above, the compatiblizing coating compositions from which the compatiblizing coatings may be derived, may further comprise:

(a) an epoxy-containing material comprising at least two reactive functional groups, at least one of which is an epoxy group;

(b) an isocyanate-containing material comprising at least two reactive functional groups, at least one of which is an isocyanate group;

(c) a (meth)acrylate-containing material comprising at least two reactive functional groups, at least one of which is a (meth)acrylate group; and/or (d) an aminoplast resin comprising at least two reactive functional groups. Additionally, the compatiblizing coating compositions from which the compatiblizing coatings may be derived, may optionally comprise a coupling agent, an at least partial hydrolysate thereof, or a mixture thereof; and at least one of an a initiator and a catalyst.

Non-limiting examples of epoxy-containing materials that may be used can include epoxy-containing materials comprising at least one epoxy group and at least one of an acrylate group, an isocyanate group, a thiol group, an additional epoxy group, a silane group, and a glycidyl group.

The epoxy-containing material of the compatiblizing coating composition may be an epoxy-containing material comprising at least two epoxy groups. Non-limiting examples of epoxy-containing materials comprising at least two epoxy groups may be represented by the following graphic formulae I, II, or a mixture thereof:

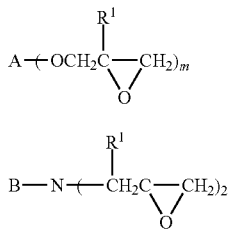

wherein:
(a) $R^1$ may represent a group, such as, hydrogen or $C_1$-$C_3$ alkyl;
(b) m may represent an integer ranging from 2 to 4;
(c) A may represent a group, such as,
   (i) $C_2$-$C_{20}$ alkylene, substituted $C_2$-$C_{20}$ alkylene, $C_3$-$C_{20}$ cycloalkylene, substituted $C_3$-$C_{20}$ cycloalkylene, an unsubstituted or substituted arylene group, such as, phenylene or naphthylene, aryl($C_1$-$C_3$)alkylene, substituted aryl($C_1$-$C_3$)alkylene, wherein said alkylene and cycloalkylene substituents are each independently carboxy, hydroxy, or $C_1$-$C_3$ alkoxy, and wherein said arylene and aryl($C_1$-$C_3$)alkylene substituents are each independently carboxy, hydroxy, $C_1$-$C_3$ alkoxy, or $C_1$-$C_3$ alkyl;
   (ii) the group —C(=O)$R^2$(O=)C—, wherein $R^2$ represents a group, such as, $C_2$-$C_{20}$ alkylene or arylene;
   (iii) the group —$R^3$—(O$R^3$—)$_n$ or —(O$R^3$)$_n$—, wherein $R^3$ represents a group, such as, $C_2$-$C_4$ alkylene and n represents an integer ranging from 1 to 20,
   (iv) phthaloyl, isophthathoyl, terephthaloyl, hydroxyl-substituted phthaloyl, hydroxy-substituted isophthaloyl, hydroxy-substituted terephthaloyl; or
   (v) a group represented by the following graphic formula:

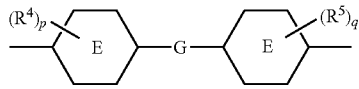

wherein $R^4$ and $R^5$ each independently represents a group, such as, $C_1$-$C_4$ alkyl, chlorine or bromine, p and q each independently represents an integer ranging from 0 to 4, each

independently represents a group, such as, a divalent benzene group or a divalent cyclohexane group, and, when

is a divalent benzene group, G represents a group, such as, —O—, —S—, —S(O$_2$)—, —C(=O)—, —CH$_2$—, —CH=CH—, —C(CH$_3$)$_2$—, —C(CH$_3$)(C$_6$H$_5$)—, —(C$_6$H$_4$)— or

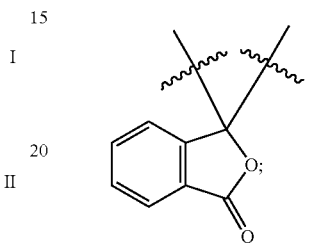

or when

is a divalent cyclohexane group, G represents a group, such as, —O—, —S—, —CH$_2$— or —C(CH$_3$)$_2$—; and (d) B represents a group, such as, $C_2$-$C_{20}$ alkyl, substituted $C_2$-$C_{20}$ alkyl, $C_3$-$C_{20}$ cycloalkyl, substituted $C_3$-$C_{20}$ cycloalkyl, the unsubstituted or substituted aryl groups, phenyl and naphthyl, aryl($C_1$-$C_3$)alkyl, or substituted aryl($C_1$-$C_3$)alkyl, wherein said alkyl and cycloalkyl substituents are each independently carboxy, hydroxy, or $C_1$-$C_3$ alkoxy, and wherein said aryl and aryl($C_1$-$C_3$)alkyl substituents are each independently carboxy, hydroxy, $C_1$-$C_3$ alkoxy, or $C_1$-$C_3$ alkyl.

The epoxy-containing material of the compatiblizing coating composition also may be represented by graphic formula I, II or a mixture thereof wherein: $R^1$ is hydrogen; A represents a group, such as,

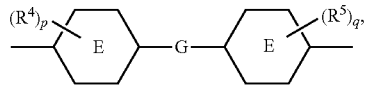

wherein $R^4$, $R^5$, E and G may represent groups such as those discussed above, and p and q are as defined above; $C_2$-$C_{10}$ alkylene; phenylene; —$R^3$—(O$R^3$)$_n$— or —(O$R^3$)$_n$—, wherein $R^3$ and n are the same as defined hereinbefore or phthaloyl; and B represents a group, such as, $C_2$-$C_{10}$alkyl, phenyl or phenyl($C_1$-$C_3$)alkyl.

Specific non-limiting examples of epoxy-containing material comprising at least two epoxy groups that may be used in the compatiblizing coating compositions can include glycerol polyglycidyl ether, diglycerol polyglycidyl ether, glycerol propoxylate triglycidyl ether, trimethylolpropane triglycidyl ether, sorbitol polyglycidyl ether, poly(ethylene glycol) diglycidyl ether, poly(propylene glycol)diglycidyl ether, neopentyl glycol diglycidyl ether, N,N-diglycidyl-4-glycidyloxyaniline, N,N'-diglycidyltoluidine, 1,6-hexane diol diglycidyl ether, diglycidyl 1,2-cyclohexanedicarboxylate, diglycidyl bisphenol A (e.g., diglycidyl ether of bisphenol A), a polymer of diglycidyl bisphenol A, glycidyl endcapped poly(bisphenol A-co-epichlorohydrin), diglycidyl of a hydrogenated bisphenol A propylene oxide adduct, diglycidyl ester of terephthalic acid, diglycidyl 1,2,3,6-tetrahydrophthalate, spiroglycoldiglycidyl ether, hydroquinone diglycidyl ether, and mixtures thereof.

Non-limiting examples of isocyanate-containing materials that may be used in the compatiblizing coating compositions of the present invention can include isocyanate-containing materials comprising at least one isocyanate group and at least one of a hydroxyl group, an acrylate group, an acid group, an additional isocyanate group, a thiol group, an amine group, an epoxy group, a silane group, a vinyl group, an allyl group, and a glycidyl group. As used herein, the term isocyanate-containing material includes materials containing at least one isocyanate group, which may be a blocked isocyanate group or an unblocked isocyanate group.

Non-limiting examples of isocyanate-containing materials comprising at least two reactive functional groups at least one of which is an isocyanate group that can be used can include: m-isopropenyl-α,α-dimethyl benzyl isocyanate; a product of the reaction of an acrylic functional monomer(s) containing a vinyl ether group and isocyanic acid; a product of the reaction of unsaturated monomer(s) having a functional group chosen from amino, hydroxy, thio and a combination thereof with an isocyanate-containing compound(s) having at least two functional isocyanate groups; and mixtures of any of the foregoing. Such isocyanate-containing materials and methods of preparing the same are described in detail in U.S. Pat. No. 6,025,026 at col. 6, line 37 to col. 8, line 65, which disclosure is hereby specifically incorporated by reference.

For example, the isocyanate-containing material may be selected from one or more polyisocyanates such as diisocyanates and triisocyanates including biurets and isocyanurates. Biurets of any suitable diisocyanate including 1,4-tetramethylene diisocyanate and 1,6-hexamethylene diisocyanate may be used as the isocyanate containing material in the preparation of the reaction product of the present disclosure. Also, biurets of cycloaliphatic diisocyanates such as isophorone diisocyanate and 4,4'-methylene-bis-(cyclohexyl isocyanate) may be employed. Examples of suitable aralkyl diisocyanates from which biurets may be prepared are meta-xylylene diisocyanate and α,α,α',α'-tetramethylmeta-xylylene diisocyanate. The diisocyanates themselves may also be used as the isocyanate containing material in the preparation of the reaction product of the present disclosure.

The trifunctional isocyanates may also be used as the isocyanate containing material, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the trade name CYTHANE 3160 by CYTEC Industries, and DESMODUR N 3300, which is the isocyanurate of hexamethylene diisocyanate, available from Bayer Corporation. Further, the polyisocyanates may include cyclic isocyanates, such as, for example, isocyanurates of diisocyanates such as hexamethylene diisocyanate and isophorone diisocyanate.

The polyisocyanate which may be used as the isocyanate containing material may also be one of those disclosed above, chain extended with one or more polyamines and/or polyols using suitable materials and techniques known to those skilled in the art.

The isocyanate-containing material of the compatiblizing coating composition may be an isocyanate-containing material comprising at least two isocyanate groups. Non-limiting examples of isocyanate-containing materials comprising at least two isocyanate groups include: toluene-2,4-diisocyanate; toluene-2,6-diisocyanate; diphenyl methane-4,4'-diisocyanate; diphenyl methane-2,4'-diisocyanate; paraphenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanato ethyl)fumarate; isophorone diisocyanate, commercially available under the trademark DESMODUR PL 340 from Bayer Materialscience, Pittsburgh, Pa.; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; naphthylene-1,5-diisocyanate; and mixtures thereof.

As used herein, the terms "(meth)acryl", "(meth)acrylic" or "(meth)acrylate" are intended to cover both the acryl/acrylic/acrylate and methacryl/methacrylic/methacrylate forms of the indicated material. Non-limiting examples of (meth)acrylate-containing materials that may be used in the compatiblizing coating compositions can include: acrylate and methacrylate monomers, including polyfunctional acrylates and methacrylates, e.g., di-, tri-, tetra-, and penta-functional acrylates and methacrylates.

The compatiblizing coating may be prepared using acrylic or methacrylic monomers or a mixture of acrylic and/or methacrylic monomers. The mixture of (meth)acrylic monomers may include mono-, di-, tri-, tetra-, and penta-acrylic functional monomers.

Non-limiting examples of (meth)acrylate monomers include polyfunctional (meth)acrylates, e.g., di-, tri-, tetra-, and penta-functional (meth)acrylates. Non-limiting examples of (meth)acrylates that may be used in the compatiblizing coating compositions according to the present invention may be represented by the following general formula VI:

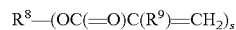

$$R^8-(OC(=O)C(R^9)=CH_2)_s \quad\quad VI$$

wherein $R^8$ represents a group, such as, an aliphatic or aromatic group containing from 2 to 20 carbon atoms and optionally from 1 to 20 alkyleneoxy linkages; $R^9$ represents a group, such as, hydrogen or an alkyl group containing from 1 to 4 carbon atoms, and s represents an integer ranging from 1 to 5. When s is greater than 1, $R^8$ is a linking group that links the acrylic functional groups together. Typically, $R^9$ is hydrogen or methyl, and s is an integer ranging from 1 to 3. More specifically, di(meth)acrylates (when s is 2) may be represented by general formula VII:

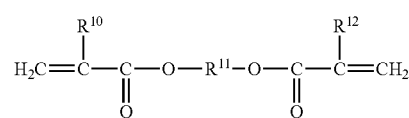

wherein $R^{10}$ and $R^{12}$ may be the same or different and each represent groups, such as, hydrogen or alkyl groups containing from 1 to 4 carbon atoms, preferably hydrogen or methyl, and $R^{11}$ represents a hydrocarbon linking group of, for example, from 1 to 20 carbon atoms, e.g., an alkylene group, one or more oxyalkylene group(s) (or mixture of different oxyalkylene groups); or a group of the following general formula VIII:

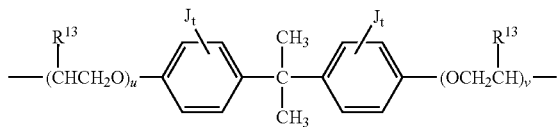

wherein each $R^{13}$ independently represents a group, such as, hydrogen or an alkyl group of from 1 to 4 carbon atoms, e.g., methyl; each J independently represents a halogen atom, e.g., chlorine; each t independently represents an integer ranging from 0 to 4, e.g., 0 to 1; and u and v are numbers ranging from 0 to 20, e.g., 1 to 15, or 2 to 10. The values of u and v are average numbers and when calculated may be a whole number or a fractional number.

(Meth)acrylates having an epoxy group may be represented by the following general formula IX:

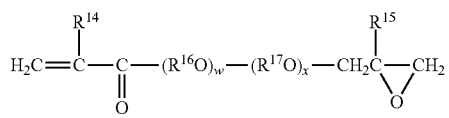

wherein $R^{14}$ and $R^{15}$ may be the same or different and each independently represent a group, such as, hydrogen or an alkyl group of from 1 to 4 carbon atoms, e.g., methyl; $R^{16}$ and $R^{17}$ may be alkylene groups containing from 2 to 3 carbon atoms, e.g., ethylene and propylene, and w and x are numbers of from 0 to 20, e.g., 0 or 1 to 15 or 2 to 10. When one of w and x is 0 and the other is 1, the remaining group $R^{16}$ or $R^{17}$ may be an aromatic group having the following formula X:

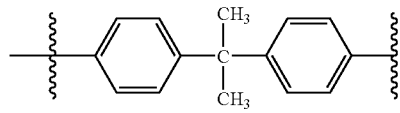

e.g., a group derived from the 2,2-diphenylenepropane radical, which phenyl groups may be substituted with $C_1$ to $C_4$ alkyl groups or halogens, e.g., methyl and/or chlorine.

The compatiblizing coating compositions may further comprise an aminoplast resin. Aminoplast resins include condensation products of amines or amides with aldehydes and have at least two reactive groups. Suitable aminoplasts may be made by reaction of materials bearing NH groups, such as urea, melamine, benzoguanamine, glycouril, and cyclic ureas, with carbonyl compounds such as formaldehyde or higher aldehyde and ketones, and alcohols such as methanol ethanol, butanol propanol, and hexanol. Condensation products obtained from the reaction of alcohols and formaldehyde with melamine, urea or benzoguanamine are most common. However, condensation products of other amines and amides may also be used, for example, aldehyde condensates of triazines, diazines, triazoles, guanadines, guanamines and alkyl- and aryl-substituted melamines. Aminoplast resins are commercially available from Cytec Industries, Inc. under the trademarks CYMEL and RESIMENE. Non-limiting examples of such products include CYMEL® 345, 350 and/or 370 resins and RESIMENE® 717, 730 and/or 735 resins. Suitable reactive functional groups on the aminoplast resin include any of the reactive groups disclosed herein, for example, hydroxyl, acrylate, methacrylate, acid, isocyanate, thiol, amine, epoxy, silane, and glycidyl.

As discussed above, compatiblizing coating compositions that may be used to form the compatiblizing coatings according to the present invention optionally may comprise a coupling agent, an at least partial hydrolysate thereof, or a mixture thereof. As used herein the phrase "at least partial hydrolysate" of a coupling agent refers to a coupling agent that is at least partially or completely hydrolyzed. Non-limiting examples of coupling agents that may be used can include silanes, titanates, and/or zirconates.

For example, the coupling agent may be a silane coupling agent represented by the following graphic formula V:

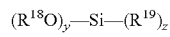

wherein for each occurrence:

$R^{18}$ independently represents a group, such as, a hydrocarbon substituent having not more than 20 carbon atoms that is unsubstituted or substituted with epoxy, glycidoxy, amino, vinyl, benzyl, styryl, (meth)acryloxy, mercapto, halogen, ureido, or alkoxy;

$R^{19}$ independently represents a group, such as, epoxy, glycidoxy, amino, vinyl, benzyl, styryl, (meth)acryloxy, mercapto, halogen, ureido, alkoxy, or an aliphatic, cycloaliphatic or aromatic hydrocarbon substituent having not more than 20 carbon atoms that is unsubstituted or substituted with epoxy, glycidoxy, amino, vinyl, benzyl, styryl, (meth)acryloxy, mercapto, halogen, ureido, or alkoxy, or two $R^{19}$ groups may combine to form a $C_4$-$C_7$ cycloalkyl or heterocyclic group wherein the heteroatom at least one of oxygen and nitrogen;

y represents an integer ranging from 1 to 4; and z represents an integer ranging from 0 to 3, provided that the sum of y+z is 4.

Where the compatiblizing coating composition does not comprise a coupling agent, the dendritic polymer of the compatiblizing coating composition may optionally comprise, in addition to one or more terminal hydroxyl, (meth)acrylate, carboxylic acid, isocyano, thiol, amine, epoxy, or glycidyl groups, at least one terminal silane group. Additionally or alternatively, at least one of the functional groups of the epoxy-containing material, the isocyanate-containing material, the (meth)acrylate-containing material, or the aminoplast resin material of the compatiblizing coating composition may be a silane group.

As indicated above, the compatiblizing coating compositions that may be used to form the compatiblizing coatings may optionally comprise at least one of an initiator and a catalyst. As used herein, the term "initiator" refers to a substance that initiates a chemical reaction. Further, as used herein, the term "catalyst" refers to a substance that increases the rate of a chemical reaction without itself undergoing any permanent chemical change.

Where the compatiblizing coating composition comprises at least one epoxy-containing material (as discussed above), the compatiblizing coating composition will generally comprise at least one initiator, for example, a thermal initiator and/or a photoinitiator that may facilitate setting of the epoxy-containing material by generating an acid on exposure to heat and/or actinic radiation. For example, and without limitation herein, the acid generated by the initiator may be a Lewis acid or a Brønsted acid. Further, if the compatiblizing coating composition comprises a silane coupling agent or at least partial hydrolysate thereof (as discussed above), the acid generated by the initiator may also facilitate condensation of the silane coupling agent by decreasing the pH of the composition. As used herein with reference to coatings, coating compositions, or components thereof, the terms "set," "setting," etc., are intended to include processes such as, but not limited to, curing, polymerizing, cross-linking, cooling, and drying.

Although not limiting herein, it is contemplated that if, in addition to at least one epoxy-containing material, the compatiblizing coating composition comprises a dendritic polymer that comprises terminal (meth)acrylate groups (e.g., an acrylated polyester-type dendritic polymer, examples of which are discussed above), the use of initiator(s) that is capable of generating both an acid and a free-radical may facilitate setting (e.g., cross-linking) of the dendritic polymer, in addition to facilitating setting of the epoxy-containing material. A combination of an initiator that is capable of generating an acid and an initiator that is capable of generating a free-radical also may be used.

The initiator may be a photoinitiator that is adapted to generate an acid on exposure to actinic radiation. Non-limiting examples of suitable photoinitiators that may be adapted to generate an acid on exposure to actinic radiation include onium salts and iodosyl salts, aromatic diazonium salts, metallocenium salts, o-nitrobenzaldehyde, sulphonate esters or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain.

Specific non-limiting examples of onium salts that may be used in conjunction with various non-limiting embodiments disclosed herein include diaryliodonium salts and triarylsulfonium salts. Other suitable onium salts are described in U.S. Pat. No. 5,639,802, at col. 8, line 59 to col. 10, line 46, which disclosure is incorporated by reference. Non-limiting examples of triarylsulfonium salts include triarylsulfonium hexafluorophophate salts and triarylsulfonium hexafluoroantimonate salts. Non-limiting examples of diaryliodonium salts include 4,4'-dimethyldiphenyliodonium tetrafluoroborate salts, phenyl-4-octyloxyphenyl phenyliodonium hexafluoroantimonate salts, dodecyldiphenyl iodonium hexafluoroantimonate salts, [4-[(2-tetradecanol)oxy]phenyl] phenyl iodonium hexafluoroantimonate salts, and mixtures of any thereof.

Further, where the compatiblizing coating composition comprises at least one isocyanate-containing material, the compatiblizing coating composition generally will comprise a catalyst, which may be a photocatalyst, that may facilitate setting of the isocyanate-containing material. Non-limiting examples of a suitable catalyst can include organo-tin catalysts and organo-bismuth catalysts. Further, if in addition to the isocyanate-containing material, the compatiblizing coating composition comprises an epoxy-containing material, a silane coupling agent or at least partial hydrolysate thereof, and/or a dendritic polymer that comprises terminal acrylate groups, the compatiblizing coating composition also may comprise an initiator that is adapted to generate an acid, and which optionally may also generate a free-radical, to facilitate setting of these materials. Non-limiting examples of suitable initiators are set forth above.

Where the compatiblizing coating composition comprises a photoinitiator and/or a photocatalyst, a photosensitive dye optionally may be added to the compatiblizing coating composition to adjust the wavelength of actinic radiation to that needed to activate the photoinitiator and/or photocatalyst. Non-limiting examples of photosensitive dyes can include acridine cationic dyes, benzoflavin cationic dyes, benzophenone-type basic dyes, perylene-type dyes, fluorine-type dyes, and mixtures and combinations of any thereof.

The compatiblizing coating compositions of the present invention may further comprise one or more additives that may aid in the processing and/or performance of the composition or a coating or article derived therefrom. Non-limiting examples of such additives can include, for example, polymerization inhibitors, solvents, light stabilizers (such as, but not limited to, ultraviolet light absorbers and light stabilizers, such as, hindered amine light stabilizers (HALS)), heat stabilizers, mold release agents, rheology control agents, leveling agents (such as, but not limited to, surfactants), free radical scavengers, and combinations and mixtures of any thereof.

The compatiblizing coating comprising the dendritic polymer that is on at least a portion of the surface of the substrate may be derived from a compatiblizing coating composition comprising:

(a) a dendritic polymer comprising a terminal functional group;
(b) an epoxy-containing material comprising at least two reactive functional groups, at least one of which is an epoxy group;
(c) an aminoplast resin comprising at least two reactive functional groups;
(d) a coupling agent, an at least partial hydrolysate thereof, or a mixture thereof; and optionally,
(e) an initiator.

For example, the dendritic polymer may be a dendritic polymer comprising at least one terminal acrylate group; the epoxy-containing material may be an epoxy-containing material comprising at least two epoxy groups; the aminoplast resin may be an aminoplast resin comprising at least two reactive functional groups; the coupling agent, at least partial hydrolysate thereof or mixture thereof, may be a silane coupling agent, an at least partial hydrolysate thereof, or a mixture thereof; and the initiator may be a photoinitiator adapted to generate an acid on exposure to actinic radiation. Suitable non-limiting examples of dendritic polymers comprising at least one terminal acrylate group, epoxy-containing materials comprising at least two epoxy groups, aminoplast resins comprising at least two reactive functional groups, silane coupling agents, and photoinitiators adapted to generate an acid on exposure to actinic radiation are set forth above in detail.

Additionally, the compatiblizing coating comprising the dendritic polymer that is on at least a portion of the surface of the substrate may be derived from a compatiblizing coating composition comprising:

(a) a dendritic polymer comprising a terminal acrylate group;
(b) an isocyanate-containing material comprising at least two isocyanate groups;
(c) an aminoplast resin comprising at least two reactive functional groups;
(d) a silane coupling agent, an at least partial hydrolysate thereof, or a mixture thereof; and
(e) optionally, at least one of a catalyst and an initiator.

For example, the dendritic polymer may be a dendritic polymer comprising at least one terminal acrylate group; the isocyanate-containing material may be an isocyanate-containing material comprising at least two isocyanate groups (which may be blocked or unblocked); the aminoplast resin may be an aminoplast resin comprising at least two reactive functional groups; the coupling agent, at least partial hydrolysate thereof, or mixture thereof, may be a silane coupling agent, an at least partial hydrolysate thereof, or a mixture thereof; the initiator may be a photoinitiator; and the catalyst may be at least one of an organo-tin catalyst and an organo-bismuth catalyst. Suitable non-limiting examples of dendritic polymers comprising at least one terminal acrylate group, isocyanate-containing materials comprising at least two isocyanate groups (which may be blocked or unblocked), aminoplast resins comprising at least two reactive functional groups, silane coupling agents, photoinitiators, and catalysts that may be used in connection with these non-limiting embodiments are set forth above.

Further, the compatiblizing coating comprising the dendritic polymer that is on at least a portion of the surface of the substrate may be derived from a compatiblizing coating composition comprising:

(a) a dendritic polymer comprising a terminal (meth)acrylate;

(b) a (meth)acrylate-containing material comprising at least two (meth)acrylate groups;

(c) an aminoplast resin comprising at least two reactive functional groups;

(d) a silane coupling agent, an at least partial hydrolysate thereof, or a mixture thereof; and optionally, (e) an initiator, which may be, for example, a photoinitiator.

Suitable non-limiting examples of dendritic polymers comprising a terminal (meth)acrylate group, (meth)acrylate-containing materials comprising at least two (meth)acrylate groups, aminoplast resins comprising at least two reactive functional groups; silane coupling agents, initiators, and more particularly photoinitiators, that may be used in connection with these non-limiting embodiments are set forth above in detail.

The compatiblizing coating compositions disclosed herein may comprise, for example, at least 20 weight percent of a dendritic polymer on a total solids basis such as from 20 to 80 weight percent of the compatiblizing coating composition on a total solids basis or from 30 to 70 weight percent of the compatiblizing coating composition on a total solids basis.

The compatiblizing coating composition may comprise, on a total solids basis, from 5 to 50 weight percent, such as from 10 to 40 weight percent or from 15 to 30 weight percent of an epoxy-containing material, a isocyanate-containing material, a (meth)acrylate-containing material, the aminoplast resin, or a mixture of any thereof.

The compatiblizing coating composition may comprise, on a total solids basis, from 5 to 50 weight percent, such as from 10 to 40 weight percent, or from 15 to 30 weight percent of a coupling agent, at least partial hydrolysate thereof, or mixture thereof.

The amount of initiator(s) and/or catalyst(s) present in the compatiblizing coating compositions disclosed herein may be any amount sufficient to provide the coating with the desired setting characteristics. While the precise amount of initiator(s) and/or catalyst(s) employed in the compatiblizing coating compositions disclosed herein will depend on several factors, such as, but not limited to, curing conditions, desired curing time, etc., those skilled in the art will be able to readily determine the types and amounts of initiator(s) and/or catalyst(s) necessary to achieve the desired setting characteristics. For example, initiator(s) and/or catalyst(s) may be present in the compatiblizing coating compositions in an amount ranging from 0.1 to 10 weight percent on a total solids basis.

The present invention also relates to compatiblizing coatings that are essentially free of photochromic materials and that are derived from a compatiblizing coating composition comprising an isocyanate-containing material and a (meth)acrylate-containing material. Such compatiblizing coatings optionally may comprise a dendritic polymer or an aminoplast resin. For example, the (meth)acrylate-containing material of the compatiblizing coating composition may be a dendritic polymer (such as those (meth)acrylate functionalized dendritic polymers described above), or the compatiblizing coating composition may comprise a dendritic polymer comprising a functional group other than a (meth)acrylate group.

For example, the present invention provides an ophthalmic element comprising:

(a) an ophthalmic substrate;

(b) a compatiblizing coating, that is essentially free of photochromic materials, on at least a portion of a surface of the ophthalmic substrate, the compatiblizing coating being formed from a compatiblizing coating composition comprising:

(i) an isocyanate-containing material comprising at least two isocyanate groups, (ii) a (meth)acrylate-containing material comprising at least two reactive functional groups, at least one of which is a (meth)acrylate group, (iii) an aminoplast resin comprising at least two reactive functional groups, (iv) a coupling agent, an at least partial hydrolysate thereof, or a mixture thereof, (v) at least one of an initiator and a catalyst; and (c) a functional organic coating, other than an abrasion-resistant coating, in contact with at least a portion of the compatiblizing coating opposite the ophthalmic substrate.

For example, according to these non-limiting embodiments, the isocyanate-containing material of the compatiblizing coating composition may be an isocyanate-containing material comprising at least two isocyanate groups (which may be blocked or unblocked); the (meth)acrylate-containing material may be a (meth)acrylate-containing material comprising at least two (meth)acrylate groups; the aminoplast resin may be an aminoplast resin comprising at least two reactive functional groups; the coupling agent, at least partial hydrolysate thereof, or mixture thereof may be a silane coupling agent; the initiator may be a photoinitiator; and the catalyst may be at least one of an organo-tin catalyst or an organo-bismuth catalyst. Specific non-limiting examples of these, as well as other suitable isocyanate-containing materials, (meth)acrylate containing materials, aminoplast resins, coupling agents, initiators, and catalysts that may be present in the compatiblizing coating compositions according to these non-limiting embodiments are set forth above.

Although not limiting herein, the compatiblizing coating that is on at least a portion of a surface of the substrate also may be an alignment coating for a functional organic coating comprising a liquid crystal material (i.e., a liquid crystal coating) that is applied thereto. As used herein, the term "alignment coating" refers to a coating comprising an at least partially ordered alignment medium that may be used to impart a suitable arrangement or position to another material or coating. As used herein, the term "to order" (and other forms thereof, e.g., ordering, ordered, etc.) means to bring into a suitable arrangement or position, such as aligning with another structure or material, or by some other force or effect. Thus, as used herein "ordering" includes both contact methods of ordering a material, such as by aligning the material with another structure or material, as well as non-contact methods of ordering a material, such as by exposing the material to an external force or effect (e.g., polarized radiation, an electric or magnetic field, a shear force, etc.). Ordering may also encompass combinations of contact and non-contact methods. Further, as used herein, the term "to align" (and other forms thereof e.g., aligning, aligned, etc.) means to bring into suitable arrangement or position by interaction with another material, compound or structure. For example, while not limiting herein, liquid crystal coatings, (i.e., coatings comprising a liquid crystal material) may be at least partially aligned by contact with the surface of an alignment coating. As used herein, the term "liquid crystal material" refers to a liquid crystal mesogen or a material (such as, but not limited to, a monomer, oligomer, or polymer) that comprises liquid crystal mesogen(s).

More specifically, because liquid crystal materials contain mesogens having rod- or disc-like structures, a rigid long axis, and strong dipoles, liquid crystal materials are generally capable of being ordered or aligned so as to take on a general direction. Thus, a liquid crystal material may be ordered or aligned by interaction with an external force or another structure (such as an alignment coating) such that the long axes of the mesogens of the material (or some portion of the material) take on general direction that is generally parallel to a common axis. As used herein, the term "general direction" refers to the predominant arrangement or orientation of a material or structure. However, it is to be appreciated that a material or structure may have a general direction even though there is some variation within the arrangement of the material or structure, provided that the material or structure, or some portion thereof, has at least one predominate arrangement. Non-limiting examples of liquid crystal materials that may be used to form liquid crystal coatings disclosed herein are set forth below in detail.

For example, where the compatiblizing coating also serves as an alignment coating, at least a portion of the surface of the compatiblizing coating may be rubbed, for example, using a textured cloth, a velvet brush, or the like, or the surface may be otherwise textured, for example, by etching, to impart a desired order to the surface of the compatiblizing coating. Further, where the compatiblizing coating also serves as an alignment coating, the compatiblizing coating may be at least partially set prior to rubbing or texturing the coating.

The compatiblizing coatings and/or the compatiblizing coating compositions from which they may be derived may be essentially free of photochromic materials. As used herein with respect to the various coatings described herein, the term "essentially free of photochromic materials" means the coating contains less than a photochromic amount of such materials or no photochromic materials. As used herein, the term "photochromic" means having an absorption spectrum for at least visible radiation that varies in response to at least actinic radiation. As used herein, the term "photochromic material" means any substance that is adapted to display photochromic properties, i.e. adapted to have an absorption spectrum for at least visible radiation that varies in response to at least actinic radiation. Further, as used herein, the term "photochromic amount" means an amount of photochromic material sufficient to impart visibly discernible photochromic properties to a coating or other article into which the photochromic material is incorporated. Thus, compatiblizing coatings and/or the compatiblizing coatings from which they may be derived that are essentially free of photochromic materials may comprise less than a photochromic amount of photochromic materials or may be free of photochromic materials, that is, they may contain no photochromic materials.

As discussed above, the present invention also relates to optical elements comprising a substrate, such as, but not limited to, those described above, a compatiblizing coating comprising a dendritic polymer on at least a portion of a surface of the substrate, which may be derived from the compatiblizing coating compositions, such as discussed above, and a functional organic coating, other than an abrasion-resistant coating, in contact with at least a portion of the compatiblizing coating opposite the substrate. As used herein, the term "functional organic coating" refers to a coating that imparts a desired property or characteristic to an article to which it is connected and predominantly comprises, on a weight percent basis, an organic material (i.e., an organic or hydrocarbon compound). The functional organic coatings of the present invention can be derived from compositions predominantly comprising an organic material, and which may optionally comprise inorganic material(s) or other carbon compounds, such as, for example, other additives. Other additives suitable for use in the functional organic coating can include, for example, polymerization inhibitors, solvents, light stabilizers (such as, but not limited to, UV light absorbers and HALS), heat stabilizers, mold release agents, rheology control agents, leveling agents (such as, but not limited to, surfactants), free radical scavengers, and combinations and mixtures of any thereof. The functional organic coating may be at least one of a photochromic coating, an alignment coating and a liquid crystal coating. Non-limiting examples of such functional organic coatings are set forth below in more detail.

The functional organic coating that is in contact with at least a portion of the compatiblizing coating may be a photochromic coating. As used herein, the term "photochromic coating" refers to a coating comprising a photochromic amount of at least one photochromic material. As previously discussed, photochromic coatings can impart photochromic properties to optical elements, such as ophthalmic elements, to which they are connected. A photochromic coating generally has a first clear state that corresponds to the color of the photochromic material(s) contained in the photochromic coating in their ground-state forms (i.e., when not exposed to actinic radiation), and a second colored state that corresponds to the color of the photochromic material(s) contained in the photochromic coating in their activated-state form (i.e., when exposed to actinic radiation). For example, if the optical element is an ophthalmic lens comprising the photochromic coating, the lens may transform from a clear state to a colored state when the wearer is exposed to UV radiation, for example, from sunlight, and may revert back to the clear state when the wearer is not exposed to UV radiation.

Non-limiting examples of photochromic coating compositions that may be used to prepare photochromic coatings according to various non-limiting embodiments disclosed herein are described below. Such photochromic coating compositions are known and may be made with components and according to methods well understood and appreciated by those skilled in the art. For example, photochromic polyurethane coatings compositions that may be used to prepare the photochromic coatings according to the present invention may be produced by the catalyzed or uncatalyzed reaction of an organic polyol component and an isocyanate component in the presence of photochromic material(s). Materials and methods for the preparation of polyurethanes are described in *Ullmann's Encyclopedia of Industrial Chemistry*, Fifth Edition, 1992, Vol. A21, pages 665 to 716. Non-limiting examples of methods and materials, e.g., organic polyols, isocyanates and other components, which can be used to prepare the polyurethane coating are disclosed in U.S. Pat. No. 4,889,413, at col. 2, line 42 to col. 12, line 21; and U.S. Pat. No. 6,187,444, at col. 2, line 52 to col. 12, line 15. Other isocyanate containing coating compositions, such as mono-isocyanate coating compositions, which are disclosed in U.S. Pat. No. 6,916,537 ("the '537 patent") at col. 3, lines 1 to 12, comprise (in addition to a photochromic material) a reaction product (non-limiting examples of which are set forth in the '537 patent at col. 7, lines 4-37) of a polyol comprising at least one carbonate group (non-limiting examples of which are set forth in the '537 patent at col. 7, line 38 to col. 8, line 49) and an isocyanate comprising at least one reactive isocyanate group and at least one polymerizable double bond (non-limiting examples of which are set forth in the '537 patent at col. 8, line 50 to col. 9, line 44), and which optionally comprises an addition copolymerizable monomer (non-limiting examples of which are set forth in the '537 patent at col. 11, line 47 to col. 20, line 43). The above-referenced disclosures are hereby specifically incorporated by reference.

Non-limiting examples of photochromic aminoplast resin coating composition that may be used to produce photochromic coatings according to the present invention may be prepared by combining a photochromic material with the reaction product of a functional component(s) having at least two functional groups chosen from hydroxyl, carbamate, urea, or a mixture of any thereof and an aminoplast resin, e.g., crosslinking agent as described in U.S. Pat. No. 4,756,973, at col. 4, line 59 to col. 7, line 3; U.S. Pat. No. 6,506,488, at col. 2, line 43 to col. 12, line 23; and U.S. Pat. No. 6,432,544, at col. 2, line 32 to col. 14, line 5. The above-referenced disclosures are hereby specifically incorporated by reference.

Non-limiting examples of photochromic polysilane coating compositions contemplated for use in preparing photochromic coatings may be prepared by hydrolyzing at least one silane monomer, such as glycidoxypropyltrimethoxysilane, vinyltrimethoxysilane, methacryloxypropyltrimethoxysilane, tetramethoxysilane, tetraethoxysilane, and/or methyltrimethoxysilane, and combining the hydrolyzate with at least one photochromic material as described in U.S. Pat. No. 4,556,605, at col. 4, line 6 to col. 17, line 40, which disclosure is hereby specifically incorporated by reference.

Non-limiting examples of photochromic poly(meth)acrylate coating compositions contemplated for use in preparing the photochromic coatings the present invention may be prepared by combining photochromic materials(s) with mono-, di-, or multi-functional (meth)acrylates as described in U.S. Pat. No. 6,025,026, at col. 6, line 5 to col. 11, line 28; U.S. Pat. No. 6,150,430, at col. 2, line 51 to col. 8, line 58; and U.S. Pat. No. 6,602,603, at col. 2, line 60 to col. 7, line 50. The above-referenced disclosures are hereby specifically incorporated by reference.

Non-limiting examples of polyanhydride photochromic coating compositions that may be used to prepare the photochromic coatings according to the present invention may be prepared by the reaction of a hydroxyl-functional component and a polymeric anhydride-functional component in a composition including at least one organic photochromic material as described in U.S. Pat. No. 6,432,544, at col. 2, line 32 to col. 14, line 5. Non-limiting examples of hydroxyl-functional components, anhydride-functional component(s), and other components that can be used to prepare the polyanhydride photochromic coatings are disclosed in U.S. Pat. No. 4,798,745, at col. 2, line 67 to col. 8, line 65; U.S. Pat. No. 4,798,746, at col. 2, line 32 to col. 11, line, 45; and U.S. Pat. No. 5,239,012, at col. 3, line 17 to col. 6, line 52. Other suitable polyanhydride coating compositions are described in U.S. Pat. No. 6,436,525, at col. 2, line 15 to col. 11, line 60. The above-referenced disclosures are hereby specifically incorporated by reference.

Non-limiting examples of photochromic poly(meth)acrylamide coating compositions contemplated for use in preparing the photochromic coatings may be prepared by combining a photochromic material with the free radical initiated reaction product of a polymerizable ethylenically unsaturated composition comprising N-alkoxymethyl(meth)acrylamide and at least one other copolymerizable ethylenically unsaturated monomer, such as described in U.S. Pat. No. 6,060,001, at col. 2, line 6 to col. 5, line 39. Methods for preparing N-alkoxymethyl(meth)acrylamide functional polymers are described in U.S. Pat. No. 5,618,586, at col. 1, line 65 to col. 7, line 2. The above-referenced disclosures are hereby specifically incorporated by reference.

Non-limiting examples of photochromic epoxy resin coating compositions that can be used to prepare the photochromic coatings of the present invention, can be prepared by combining photochromic compound(s), epoxy resins or polyepoxides and curing agents as described in U.S. Pat. No. 4,756,973, at col. 3, line 50 and col. 7, line 3; and U.S. Pat. No. 6,268,055, at col. 2, line 63 to col. 17, line 3. The above-referenced disclosures are hereby specifically incorporated by reference.

Other non-limiting examples of photochromic coating compositions that may be used to form photochromic coatings disclosed herein can include the poly(urea-urethane) compositions disclosed in U.S. Pat. No. 6,531,076, at col. 3, line 4 to col. 10, line 49, which disclosure is hereby specifically incorporated by reference.

Non-limiting examples of suitable photochromic materials can include benzopyrans, naphthopyrans (e.g., those disclosed at col. 1, line 64 to col. 13, line 36 of U.S. Pat. No. 5,658,501), indeno-fused naphthopyrans (e.g., those disclosed at col. 1, line 10 to col. 12, line 57 of U.S. Pat. No. 5,645,767); spiropyrans (e.g., spiro(benzindoline)naphthopyrans, spiro(indoline)benzopyrans, spiro(indoline)naphthopyrans, spiro(indoline)quinopyrans, and spiro(indoline)pyrans); oxazines; fulgides and flugimides (e.g., those disclosed at col. 20, line 5 to col. 21, line 38 of U.S. Pat. No. 4,931,220); and metal dithiozonates (e.g., those disclosed in U.S. Pat. No. 3,361,706). The foregoing disclosures are hereby specifically incorporated by reference.

Further non-limiting examples of photochromic compounds, polymerizable photochromic compounds, and complementary photochromic compounds that may be used in are described in U.S. Pat. No. 5,166,345 at column 3, line 36 to column 14, line 3; U.S. Pat. No. 5,236,958 at column 1, line 45 to column 6, line 65; U.S. Pat. No. 5,252,742 at column 1, line 45 to column 6, line 65; U.S. Pat. No. 5,359, 085 at column 5, line 25 to column 19, line 55; U.S. Pat. No. 5,488,119 at column 1, line 29 to column 7, line 65; U.S. Pat. No. 5,821,287 at column 3, line 5 to column 11, line 39; U.S. Pat. No. 6,113,814 at column 2, line 23 to column 23, line 28; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64. The above-referenced disclosures are hereby specifically incorporated by reference.

The functional organic coating that may be in contact with at least a portion of the compatiblizing coating may be an alignment coating. As previously discussed, the term "alignment coating" refers to a coating comprising an at least partially ordered alignment medium that may be used to impart a suitable arrangement or position to another material or coating. Non-limiting examples of alignment coatings include rub-oriented alignment coatings, photo-oriented alignment coatings, and ordered liquid crystal alignment coatings. As used herein, the terms "rub-oriented alignment coating" and "rubbed alignment coating" refer to a coating that is at least partially ordered by rubbing, or otherwise texturing, at least a portion of the surface of the coating. As used herein, the term "photo-oriented alignment coating" refers to a coating that is at least partially ordered by exposure to polarized actinic radiation. Ordered liquid crystal alignment coatings can include liquid crystal coatings that have been at least partially ordered by exposure to an external force, such as, for example, a magnetic field, an electric field, or a shear force. Although not limiting herein, the alignment coatings may impart desirable orientation properties to the optical elements to which they are connected.

For example, the functional organic coating that is in contact with at least a portion of the compatiblizing coating may be an alignment coating, and more specifically, may be a rub-oriented alignment coating comprising a polyimide that is capable of being at least partially ordered by rubbing. Also the alignment coating may be a photo-oriented alignment coating comprising a photo-orientation material that is capable of being at least partially ordered by exposure to polarized actinic radiation. As used herein, the term "photo-orientation material" means a material that is capable of being at least partially ordered by exposure to polarized actinic radiation. Non-limiting examples of photo-orientation materials include cinnamate derivatives, azobenzene derivatives, coumarine derivatives, and ferulic acid derivatives. For example, the photo-orientation material may be a cinnamate derivative, such as a polyvinyl cinnamate, a polyvinyl ester of paramethoxycinnamic acid, or a polyacrylic ester of paramethoxycinnamic acid. Other non-limiting examples of suitable photo-orientation materials and methods of forming photo-oriented alignment coatings are disclosed in U.S. Pat. No. 5,389,698 at col. 1, line 35 to col. 4, line 19, which disclosure is hereby incorporated by reference; and in Kozenkov et al., "*Photoanisotropic Effects in Poly(Vinyl-Cinnamate) Derivatives and Their Applications,*" *Mol. Cryst. Liq. Cryst.*, Vol. 409 (2004) at pp. 251-259 and 265, which disclosure is hereby incorporated by reference. Further, the alignment coating may be an ordered liquid crystal alignment coating comprising a liquid crystal material that has been at least partially ordered by exposure to an external force, such as, for example, a magnetic field, an electric field, or a shear force.

As previously discussed, alignment coatings may be used, for example, to align liquid crystal coatings that are in contact therewith. Thus, when the functional organic coating in contact with at least a portion of the compatiblizing coating is an alignment coating, the optical element may further comprise a liquid crystal coating comprising an at least partially aligned liquid crystal material that is connected to, and may further be in direct contact with, at least a portion of the alignment coating such that at least a portion of the liquid crystal material may be aligned with at least a portion of the alignment coating. As discussed above, as used herein, the term "liquid crystal coating" refers to a coating comprising a liquid crystal material; and the term "liquid crystal material" refers to a liquid crystal mesogen or a material (such as, but not limited to, a monomer, oligomer, or polymer) that comprises liquid crystal mesogen(s). Non-limiting examples of liquid crystal materials that may be used to form the liquid crystal coatings can include both lyotropic and thermotropic liquid crystal monomers, oligomers, and polymers. In a particular embodiment, the liquid crystal coating may comprise a thermotropic liquid crystal material.

Specific non-limiting examples of liquid crystal monomers that may be used in conjunction with various non-limiting embodiments disclosed herein include mono- as well as multi-functional liquid crystal monomers. Further, the liquid crystal monomer can be a cross-linkable liquid crystal monomer, and can further be a photocross-linkable liquid crystal monomer. As used herein, the term "photocross-linkable" means a material, such as a monomer, an oligomer, or a polymer, that may be cross-linked on exposure to actinic radiation. For example, photocross-linkable liquid crystal monomers include those liquid crystal monomers that are cross-linkable on exposure to ultraviolet radiation and/or visible radiation, either with or without the use of polymerization initiators and/or catalysts. Non-limiting examples of cross-linkable liquid crystal monomers suitable for use in accordance with various non-limiting embodiments disclosed herein include liquid crystal monomers having functional groups chosen from acrylates, methacrylates, allyl groups, allyl ethers, alkynes, amino groups, anhydrides, epoxides, hydroxides, isocyanates, blocked isocyanates, siloxanes, thiocyanates, thiols, ureas, vinyl groups, vinyl ethers, and blends of any thereof. Non-limiting examples of photocross-linkable liquid crystal monomers suitable for use in the at least partial coatings of the alignment facilities of the present invention can include liquid crystal monomers having functional groups chosen from acrylates, methacrylates, alkynes, epoxides, thiols, and blends of any thereof.

Liquid crystal oligomers and polymers that are suitable for use in the present invention can include both main-chain liquid crystal oligomers and polymers and side-chain liquid crystal oligomers and polymers. Typically, although not limiting herein, in main-chain liquid crystal oligomers and polymers, rod- or disc-like liquid crystal mesogens are primarily located within the backbone of the oligomer or polymer. Further, while not limiting herein, in side-chain oligomers and polymers, the rod- or disc-like liquid crystal mesogens are primarily located within the side chains of the oligomer or polymer. Additionally, the liquid crystal oligomers and polymers may be cross-linkable, and further may be photocross-linkable.

Non-limiting examples of liquid crystal oligomers and polymers that are suitable for use in accordance with the present invention include, but are not limited to, main-chain and side-chain oligomers and polymers having functional groups chosen from acrylates, methacrylates, allyl groups, allyl ethers, alkynes, amino groups, anhydrides, epoxides, hydroxides, isocyanates, blocked isocyanates, siloxanes, thiocyanates, thiols, ureas, vinyl groups, vinyl ethers, and blends of any thereof. Non-limiting examples of photocross-linkable liquid crystal oligomers and polymers that are suitable for use according to various non-limiting embodiments disclosed herein include those oligomers and polymers having functional groups chosen from acrylates, methacrylates, alkynes, epoxides, thiols, and blends of any thereof. Further description of suitable non-limiting examples of liquid crystal monomers, oligomers and polymers (including photo-cross-linkable monomers, oligomers and polymers) may be found in U.S. Pat. No. 7,044,599 B2, at column 8, line 4 to column 9, line 3, which disclosure is hereby specifically incorporated herein by reference.

Liquid crystals mesogens that are suitable for use in the present invention can include thermotropic liquid crystal mesogens and lyotropic liquid crystal mesogens. Non-limiting examples of suitable thermotropic liquid crystal mesogens can include columatic (or rod-like) liquid crystal mesogens, discotic (or disc-like) liquid crystal mesogens, and cholesteric liquid crystal mesogens.

Alternatively, as previously discussed, the compatiblizing coating itself can be a rub-oriented alignment coating. Further, the functional organic coating that is in contact with the compatiblizing coating may be another alignment coating, for example, an ordered liquid crystal alignment coating or a photo-oriented alignment coating, or it may be a liquid crystal coating comprising a liquid crystal material that may be at least partially aligned with the at least partially ordered compatiblizing coating. Although not limiting herein, the aligned liquid crystal coatings may impart certain desirable optical properties, such as, for example, variation in refractive index, to the optical elements to which they are connected. Further, as discussed below in more detail, the aligned liquid crystal coatings may themselves be used to align other materials or coatings to provide, for example and without limitation, polarizing coatings, polarizing and photochromic coatings, and photochromic-dichroic coatings. Non-limiting examples of liquid crystal materials that may be used in forming the aligned liquid crystal coatings are discussed above in detail.

The aligned liquid crystal coating may comprise a material adapted to display dichroism, and at least a portion of the material adapted to display dichroism may be at least partially aligned with at least a portion of the at least partially aligned liquid crystal material. As used herein, the term "material adapted to display dichroism" means a material that is adapted to absorb one of two orthogonal plane polarized components of at least transmitted radiation more strongly than the other. Non-limiting examples of materials that are adapted to display dichroism can include dichroic dyes and photochromic-dichroic dyes. As used herein, the term "dichroic dye" means a dye that has a generally constant absorption spectrum and that is adapted to absorb one of two orthogonal plane polarized components of at least transmitted radiation more strongly than the other. As used herein, the term "photochromic-dichroic dye" means a dye that has an absorption spectrum for at least visible radiation that varies in response to at least actinic radiation and that absorbs one of two orthogonal plane polarized components of at least transmitted radiation more strongly than the other in response to at least actinic radiation.

Non-limiting examples of dichroic dyes that may be used can include those disclosed in U.S. Pat. No. 7,044,599, at column 7, lines 18-56, which disclosure is hereby specifically incorporated herein by reference.

Non-limiting examples of photochromic-dichroic dyes that may be used can include those materials set forth and described in U.S. Patent Application Publication Nos. 2005/0004361, at paragraph 27 to paragraph 158, and 2005/0012998 A1, at paragraphs 89 to paragraph 251, which disclosures are hereby specifically incorporated herein by reference.

Although not limiting herein, the functional organic coating may be a polarizing coating comprising an aligned liquid crystal coating and an aligned dichroic dye. As used herein, the term "polarizing coating" refers to a coating that is adapted to confine the vibrations of the electromagnetic vector of light waves to one direction or plane. Generally, although not required, polarizing coatings comprising conventional dichroic dyes can have a constant (or "fixed") tint or color due to the presence of the dichroic dye. For example, the polarizing coating may have a brownish or bluish color or tint. Non-limiting examples of suitable polarizing coatings comprising aligned liquid crystal materials and dichroic dyes are described in U.S. patent application Publication No. 2005/0151926, at paragraph 10 to paragraph 159, which disclosure is hereby specifically incorporated by reference.

The polarizing coating may further comprise a photochromic material. Where the photochromic material is present, the coating may be both a polarizing and a photochromic coating, i.e., one that displays both conventional polarizing properties as well as conventional photochromic properties. For example, the polarizing and photochromic coating may have a first colored, polarizing state when not exposed to actinic radiation due primarily to the tint of the dichroic dye, and a second colored, polarizing state when exposed to actinic radiation due to the combined effect of the tint of the dichroic dye and the color of the photochromic material when exposed to actinic radiation. For example, if the optical element is an ophthalmic lens comprising the polarizing and photochromic coating, the lens may reversibly switch from a first colored, polarizing state when the wearer is not exposed to UV or actinic radiation from sunlight, to a second colored state, polarizing state when the wearer is exposed to UV or actinic radiation from sunlight.

Further, the functional organic coating may be a photochromic-dichroic coating comprising an aligned liquid crystal coating comprising an aligned photochromic-dichroic dye. As used herein, the term "photochromic-dichroic coating" refers to a coating that is adapted to display both photochromic and polarizing properties in response to at least actinic radiation. For example, according to various non-limiting embodiments disclosed herein, the functional organic coating may be a photochromic-dichroic coating that is adapted to reversibly switch from a first optically clear, non-polarizing state to a second colored, polarizing state in response to at least actinic radiation. For example, if the optical element is an ophthalmic lens comprising the photochromic-dichroic coating, the lens may reversibly switch from an optically clear, non-polarizing state when the wearer is not exposed to UV or actinic radiation, for example, out of the sunlight, to a colored, polarizing state when the wearer is exposed to UV or actinic radiation, for example, from sunlight. Non-limiting examples of such coatings are described in U.S. patent application Publication No. 2005/0012998, paragraph 11 to paragraph 442, which disclosure is hereby specifically incorporated by reference.

Other types of functional organic coatings that may be used in accordance with the present invention can include: paints, e.g., a pigmented liquid or paste used for the decoration, protection, and/or the identification of a substrate; and inks, e.g., a pigmented liquid or paste used for writing and printing on substrates, such as in producing verification marks on security documents, e.g., documents such as banknotes, passports, and drivers' licenses, for which authentication or verification of authenticity may be desired.

Further, the optical element may comprise at least one functional organic coating that is in contact with at least a portion of the compatiblizing coating and one or more additional functional organic coatings that are connected to at least a portion of the functional organic coating that is in contact with at least a portion of the compatiblizing coating. For example, the functional organic coating in contact with at least a portion of the compatiblizing coating may be an alignment coating, and the optical element may further comprise a liquid crystal coating comprising an at least partially aligned liquid crystal material that is in contact and aligned with at least a portion of the alignment coating. Further, as discussed above, the aligned liquid crystal coating may comprise a material adapted to display dichroism, and at least a portion of the material adapted to display dichroism may be at least partially aligned with at least a portion of the at least partially aligned liquid crystal material.

In addition to the compatiblizing coatings and the functional organic coatings described above, at least one of a transitional coating, a protective coating (such as those previously discussed), and an anti-reflective coating may be connected to at least a portion of the optical element. As used herein, the term "transitional coating" refers to a coating that aids in creating a gradient in properties between two coatings. For example, although not limiting herein, a transitional coating may aid in creating a gradient in hardness between a relatively hard coating and a relatively soft coating. Non-limiting examples of transitional coatings (which may also be termed "tie-layers" or "tie-layer coatings") include radiation-cured acrylate-based thin films, for example, such as those set forth in U.S. Patent Application Publication Nos. 2003/0165686 at paragraphs 79 to paragraph 173'; 2004/0207809 at paragraphs 108 to paragraph 204; 2005/0196616 at paragraphs 107 to paragraph 158; 2005/196617 at paragraphs 24 to paragraph 129; 2005/0196618 at paragraphs 28 to paragraph 291; 2005/0196626 at paragraphs 164 to paragraph 217; and 2005/196696 at paragraphs 24 to paragraph 141, which disclosures are hereby specifically incorporated herein by reference.

As used herein, the term "anti-reflective coating" refers to a coating that increases transmittance of light through a substrate by reducing the amount of light that is reflected by the substrate. Non-limiting examples of anti-reflective coatings include, for example, a monolayer or multilayer of metal oxides, metal fluorides, or other such materials. Non-limiting examples of suitable anti-reflective coatings may be found in U.S. Pat. No. 5,580,819 at column 2, line 50 to column 11, line 44, which disclosure is hereby specifically incorporated herein by reference.

For example, as shown in FIG. 1, the optical element may comprise a substrate 10 comprising an abrasion-resistant coating 12 on at least a portion of a surface 11 thereof. Further, as shown in FIG. 1, a compatiblizing coating 20 comprising a dendritic polymer, as described herein, may be on at least a portion of the abrasion-resistant coating 12, and a functional organic coating 30, for example, a photochromic coating, an alignment coating, or a liquid crystal coating, as described herein, may be on at least a portion of the compatiblizing coating 20. Further, as shown in FIG. 1, a transitional coating 40 may be on at least a portion of the functional organic coating 30, and a protective coating 50 may be on at least a portion of the transitional coating 40. Still further, although not shown in FIG. 1, an anti-reflective coating may be positioned over the protective coating 50 and/or on a surface of substrate 10 that is opposite surface 11.

Figure 2:
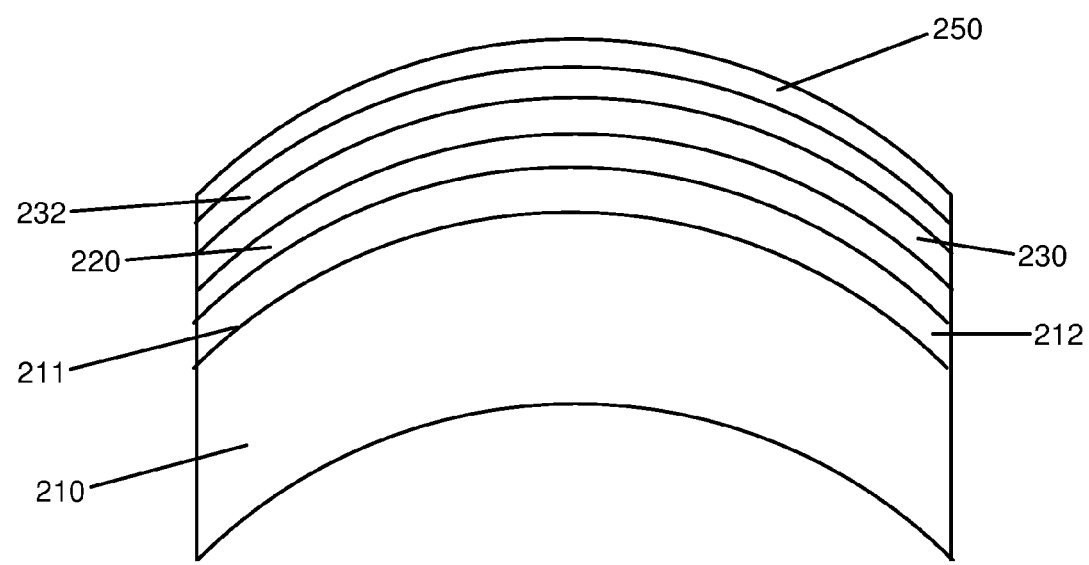

Also, as shown in FIG. 2, the optical element may comprise a substrate 210 comprising an abrasion-resistant coating 212 on at least a portion of a surface 211 thereof. Further, as shown in FIG. 2, a compatiblizing coating 220 comprising a dendritic polymer, as described herein, may be on at least a portion of the abrasion-resistant coating 212, and a functional organic coating 230, for example a photo-oriented alignment coating, as described herein, may be on at least a portion of the compatiblizing coating 220. Further, as shown in FIG. 2, a second functional organic coating 232, for example an aligned liquid crystal coating, as described herein, may be on at least a portion of the functional organic coating 230, and a protective coating 250, as described herein, may be on at least a portion of the second functional organic coating 232.

Figure 3:
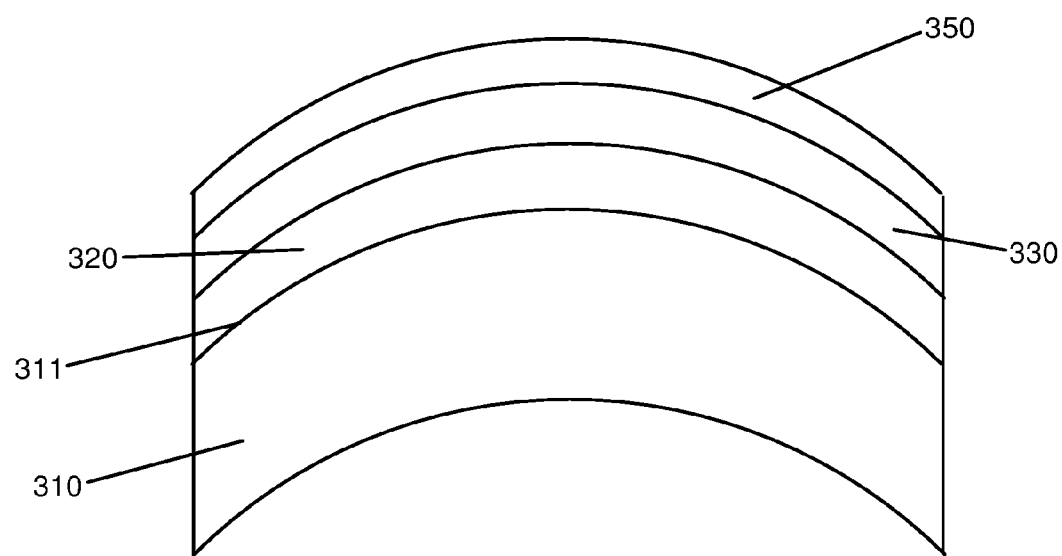

As shown in FIG. 3, the optical element also may comprise a substrate 310 comprising a compatiblizing coating 320 comprising a dendritic polymer, as described herein, on at least a portion of the surface 311 thereof. A functional organic coating 330, for example a photochromic coating, an alignment coating or a liquid crystal coating, as described herein, may be on at least a portion of the compatiblizing coating 320. Further, as shown in FIG. 3, a protective coating 350 may be on at least a portion of the functional organic coating 330.

As previously discussed, the present invention further contemplates methods of making the optical elements described above. For example, the present invention is directed to methods of making an optical element comprising forming a compatiblizing coating comprising a dendritic polymer on at least a portion of a surface of a substrate, and forming a functional organic coating, other than an abrasion resistant coating, on at least a portion of the compatiblizing coating such that the functional organic coating is in contact with at least a portion of the compatiblizing coating opposite the substrate.

Also, provided are methods of forming an ophthalmic element comprising: forming a compatiblizing coating that is essentially free of photochromic materials on at least a portion of a surface of an ophthalmic substrate, wherein the compatiblizing coating is derived from a compatiblizing coating composition comprising: (i) an isocyanate-containing material comprising at least two isocyanate groups; (ii) a (meth)acrylate-containing material comprising at least two reactive functional groups at least one of which is a (meth) acrylate group; (iii) an aminoplast resin comprising at least two reactive functional groups; (iv) a coupling agent, an at least partial hydrolysate thereof, or a mixture thereof; and (v) at least one of an initiator and a catalyst; at least partially setting at least a portion of the compatiblizing coating by exposing the portion to at least one of UV radiation and thermal radiation; and forming a functional organic coating, other than a hard coating, on at least a portion of the compatiblizing coating opposite the substrate.

As previously discussed, the substrate on which the compatiblizing coating is formed may comprise an abrasion-resistant coating on at least a portion of its surface and the compatiblizing coating may be in contact with at least a portion of the abrasion-resistant coating. Non-limiting examples of suitable substrates and abrasion-resistant coatings are described above.

Forming the compatiblizing coating on at least a portion of the surface of the substrate may comprise applying a compatiblizing coating composition on at least a portion of the substrate, for example, by one or more of spin coating, spray coating, spin and spray coating, roll coating, curtain coating, and dip coating (immersion coating). Alternatively, forming the compatiblizing coating on at least a portion of the surface of the substrate may comprise in-mold casting or overmolding.

For example, where the compatiblizing coating is formed by overmolding, a compatiblizing coating composition may be applied to a mold and thereafter a substrate may be placed into the mold such that the compatiblizing coating composition is forced to spread between the mold and the surface of the substrate to form a coating on at least a portion of the surface of the substrate. Alternatively, the substrate can be placed in the mold such that a gap exists between the mold and the surface of the substrate and thereafter the compatiblizing coating composition can be injected into the gap to form a coating on at least a portion of the surface of the substrate.

Where the compatiblizing coating is formed by in-mold casting, one or more layers of a compatiblizing coating composition may be applied to a mold, at least partially set, and thereafter, a substrate may be cast over the coating. For example, according to one non-limiting embodiment, an optical resin that is used to form the substrate may be cast in the mold, over the compatiblizing coating, and subsequently at least partially set to form the substrate.

Prior to forming the compatiblizing coating on at least a portion of the surface of the substrate, the surface may be cleaned and/or treated to provide a clean surface and a surface that may enhance adhesion of the compatiblizing coating to the substrate. Effective cleaning and treatments commonly used include, but are not limited to, ultrasonic washing with an aqueous soap/detergent solution; cleaning with an aqueous mixture of organic solvent, e.g., a 50:50 mixture of isopropanol:water or ethanol:water; UV treatment; activated gas treatment, e.g., treatment with low temperature plasma or corona discharge; and chemical treatment that results in hydroxylation of the substrate surface, e.g., etching of the surface with an aqueous solution of alkali metal hydroxide, e.g., sodium or potassium hydroxide, which solution can also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, col. 3, lines 13 to 25; U.S. Pat. No. 4,904,525, col. 6, lines 10 to 48; and U.S. Pat. No. 5,104,692, col. 13, lines 10 to 59, which describe surface treatments of polymeric organic materials. These disclosures are specifically incorporated by reference herein.

The surface treatment of the substrate may be a low temperature plasma treatment. Although not limiting herein, this method allows treatment of the surface to enhance adhesion of a coating formed thereon, and can be a clean and efficient way to alter the physical surface, e.g., by roughening and/or chemically altering the surface without affecting the rest of the article. Inert gases, such as argon, and reactive gases, such as oxygen, have been used as the plasma gas. Inert gases may roughen the surface, while reactive gases, such as oxygen, may both roughen and chemically alter the surface exposed to the plasma, e.g., by producing hydroxyl or carboxyl units on the surface. Oxygen may be used as the plasma gas. Although not limiting herein, it is considered that oxygen may provide a slight, but effective, physical roughening of the surface along with a slight, but effective, chemical modification of the surface. As will be appreciated by those skilled in the art, the extent of the surface roughening and/or chemical modification will be a function of the plasma gas and the operating conditions of the plasma unit (including the length of time of the treatment).

The surface of the substrate subjected to plasma treatment may be at room temperature or may be preheated slightly prior to or during plasma treatment. Although not limiting herein, according to various non-limiting embodiments, the temperature of the surface to be subjected to a plasma treatment may be maintained at a temperature below a temperature at which the surface may be adversely affected (other than the intended increase in surface area by roughening and slight chemical modification) by the plasma. One skilled in the art can readily select the operating conditions of the plasma unit, vis-à-vis, the plastic substrate treated, to achieve an improvement in the adhesion of a superimposed film/coating on the plasma treated surface.

After forming the compatiblizing coating and prior to forming the functional organic coating, at least a portion of the compatiblizing coating may be at least partially set. For example, at least partially setting at least a portion of the compatiblizing coating may comprise exposing the compatiblizing coating to at least one of actinic radiation, such as UV radiation, and thermal radiation. Further, setting of the compatiblizing coating may be accomplished using a dual-cure process, that is, using a two-step process involving a UV curing step and a thermal curing step. The curing steps in the dual-cure process may be performed in series, that is, one directly after the other, such that the compatiblizing coating is essentially completely set before further processing, or, alternatively, the curing steps may be performed such that the compatiblizing coating is partially set using one curing step (either thermal or UV) prior to forming additional coating(s) thereon. Thereafter, the entire structure may be subjected to the second curing step to complete the cure of the compatiblizing coating and simultaneously cure the additional coating(s). Such dual-cure processes are well known in the art and are described in more detail below.

When the compatiblizing coating composition comprises a dendritic polymer comprising at least one terminal (meth) acrylate group; an epoxy-containing material comprising at least two epoxy groups; a silane coupling agent, an at least partial hydrolysate thereof, or a mixture thereof; and a photoinitiator adapted to generate an acid on exposure to actinic radiation, at least partially setting at least a portion of the compatiblizing coating may comprise exposing the portion to UV radiation or electron beam radiation (i.e., ionizing radiation), and may further comprise exposing the portion to thermal radiation.

Also, when the compatiblizing coating composition comprises a dendritic polymer comprising at least one terminal acrylate group; an isocyanate-containing material comprising at least two isocyanate groups; a silane coupling agent, an at least partial hydrolysate thereof, or a mixture thereof; a catalyst; and a photoinitiator, at least partially setting at least a portion of the compatiblizing coating may comprise exposing the portion to UV radiation and subsequently exposing the portion to thermal radiation.

Further, where the compatiblizing coating comprises an isocyanate-containing material and a (meth)acrylate-containing material (as discussed above), prior to forming the functional coating on the compatiblizing coating, the compatiblizing coating may be at least partially set using a dual-cure process wherein the coating is first exposed to UV or electron beam radiation and subsequently exposed to thermal radiation. As will be appreciated by those skilled in the art, UV curing typically requires the presence of at least one photoinitiator. The photopolymerization process and examples of photoinitiators are disclosed in U.S. Pat. No. 6,602,603, column 12, lines 11 to 37 and line 41 to column 13, line 36, which disclosures are incorporated herein by reference. Curing by electron beam techniques typically does not require the presence of a photoinitiator. For example, the coating may be exposed to UV or electron beam radiation to at least partially set the (meth)acrylate-containing materials of the composition in one step, and subsequently exposed to thermal radiation to at least partially set the isocyanate-containing materials of the composition in another step. These curing steps may be done, for example, in series prior to forming the functional organic coating thereon. Alternatively, one of the curing steps may be performed before forming the functional organic coating on the compatiblizing coating, and one of the curing steps may be performed after forming the functional organic coating on the compatiblizing coating. For example, according to one non-limiting embodiment, the compatiblizing coating may be exposed to UV radiation or electron beam radiation prior to forming the functional organic coating thereon, and thereafter, both coatings may be exposed to thermal radiation.

The functional organic coating that is formed on at least a portion of the compatiblizing coating may be at least one of a photochromic coating, an alignment coating, and a liquid crystal coating.

When the functional organic coating may be a photochromic coating, forming the photochromic coating may comprise applying a coating composition comprising a photochromic amount of a photochromic material to at least a portion of the substrate, for example, by one or more of spin coating, spray coating, spin and spray coating, roll coating, curtain coating, and dip coating.

Alternatively the photochromic coating may be formed on the substrate by overmolding. For example, a coating composition comprising a photochromic amount of a photochromic material may be applied to a mold and thereafter a substrate may be placed into the mold such that the photochromic coating composition is forced to spread between the mold and at least a portion of a surface of the substrate. Alternatively, the substrate can be placed in the mold such that a gap exists between the mold and a surface of the substrate and thereafter the photochromic coating composition can be injected into the gap to form the coating.

Still further, a coating composition with less than a photochromic amount of a photochromic material, or no photochromic material, may be formed on the surface of the substrate, for example, by any of the foregoing methods, and thereafter, a photochromic material or an additional amount of a photochromic material can be imbibed into the coating to form the photochromic coating.

Where the functional organic coating comprises an alignment coating, forming the alignment coating may comprise applying a coating composition comprising an alignment medium to at least a portion of the compatiblizing coating, at least partially ordering at least a portion of the alignment medium, and at least partially setting at least a portion of the alignment medium. Further, at least partially ordering at least a portion of the alignment medium may occur before, during, or after at least partially setting at least a portion of the alignment medium.

For example, forming the alignment coating may comprise applying a coating composition comprising a photo-orientation material to at least a portion of the compatiblizing coating, for example, by any of the methods for applying coating compositions described herein, and simultaneously at least partially ordering and at least partially setting at least a portion of the photo-orientation material by exposing the photo-orientation material to plane polarized UV radiation. For example, according to this non-limiting embodiment, the photo-orientation material may be a photo-orientable polymer network (or "PPN") forming material, such as those described in U.S. Pat. No. 5,389,698 at col. 2, line 1 to col. 4, line 10; and Kozenkov et al., "*Photoanisotropic Effects in Poly(Vinyl-Cinnamate) Derivatives and Their Applications,*" *Mol. Cryst. Liq. Cryst.*, Vol. 409 (2004) at pp. 251-267, which disclosures are hereby incorporated by reference.

Where the alignment coating comprises a photo-oriented alignment coating, forming the alignment coating may comprise applying a coating composition comprising a photo-orientation material to at least a portion of the compatiblizing coating, for example, by any of the methods for applying coating compositions described herein, and at least partially ordering at least a portion of the photo-orientation material by exposing the photo-orientation material to plane polarized UV radiation, and subsequently at least partially setting the ordered portion of the photo-orientation material. For example, although not limiting herein, according to this non-limiting embodiment, the photo-orientation material can be an azobenzene derivative, such as described in U.S. Pat. No. 4,974,941 at col. 2, line 28 to col. 9, line 63, which disclosure is hereby incorporated by reference.

Where the alignment coating comprises a rub-oriented alignment coating, forming the alignment coating may comprise applying coating composition comprising a rub-oriented alignment material, for example, but not limited to, a polyimide, to at least a portion of the compatiblizing coating, for example, by any of the methods for applying coating compositions described herein, at least partially setting at least a portion of the rub-oriented alignment material, and subsequently ordering at least a portion of the rub-oriented alignment material by rubbing the portion with a suitable textured cloth.

Where the alignment coating comprises an ordered liquid crystal alignment coating, forming the alignment coating may comprise applying a coating composition comprising a liquid crystal material to at least a portion of the compatiblizing coating, for example, by any of the methods for applying coating compositions described herein; at least partially ordering at least a portion of the liquid crystal material by at least one of exposing the liquid crystal material to a magnetic field, an electric field, or a shear force; and at least partially setting at least a portion of the liquid crystal material. For example, at least partially setting at least a portion of the liquid crystal material may comprise exposing at least a portion of the liquid crystal material to UV radiation during or after at least partially ordering the liquid crystal material.

Further, as previously discussed, where the optical element comprises an alignment coating, the optical element may further comprise a liquid crystal coating comprising an at least partially aligned liquid crystal material on at least a portion of the alignment coating. In this instance, forming the liquid crystal coating may comprise, for example, applying a liquid crystal material, for example, by any of the methods for applying a coating composition described herein, on at least a portion of the alignment coating and at least partially aligning at least a portion of the liquid crystal material with at least a portion of the alignment coating. For example, alignment of the liquid crystal material may be achieved by allowing the liquid crystal to be in contact with the alignment coating for a period of time sufficient to achieve the desired level of alignment, either at room temperature or at an elevated temperature.

Further, at least a portion of the liquid crystal material can be at least partially set during or after alignment. For example, where the liquid crystal material comprises a photocrosslinkable liquid crystal monomer, at least partially setting at least a portion of the liquid crystal material may comprise exposing at least a portion of the liquid crystal material to UV radiation during or after at least partially aligning the liquid crystal material.

As previously discussed, the aligned liquid crystal coating according to various non-limiting embodiments disclosed herein may further comprise a material adapted to display dichroism. The material adapted to display dichroism may be blended with and/or bonded to at least a portion of the liquid crystal material prior to applying the liquid crystal material to the substrate, and at least partially aligned with at least a portion of the liquid crystal material to form a functional organic coating, such as, for example, a polarizing coating or a photochromic-dichroic coating. Additionally or alternatively, the material adapted to display dichroism may be applied to the liquid crystal coating before or after alignment of the liquid crystal coating. For example, the material adapted to display dichroism may be imbibed into at least a portion of the liquid crystal coating, either before or after aligning the portion of the liquid crystal coating, and at least partially aligned with at least a portion of the liquid crystal material to form a functional organic coating, such as, for example, a polarizing coating or a photochromic-dichroic coating. Non-limiting examples of materials adapted to display dichroism are discussed in detail above.

Further, as previously discussed, where the functional organic coating is an aligned liquid crystal coating comprising an aligned dichroic dye, the liquid crystal coating may be a polarizing coating and may further comprise a conventional photochromic material (i.e., to form a polarizing and photochromic coating). For example, the photochromic material may be blended with and/or bonded to at least a portion of the liquid crystal material prior to applying it to a portion of the substrate, and/or the photochromic material may be imbibed into the liquid crystal coating either before or after alignment thereof with the alignment coating.

Further, as previously discussed, at least a portion of the compatiblizing coating may be at least partially ordered to form an alignment coating prior to forming the functional organic coating on at least a portion of the compatiblizing coating. For example, at least a portion of the compatiblizing coating may be at least partially ordered by rubbing or etching a portion of the compatiblizing coating, typically after at least partially setting the portion of the compatiblizing coating composition. The functional organic coating that is formed on at least a portion of the at least partially ordered compatiblizing coating may be an at least partially aligned liquid crystal coating, which optionally may include at least one material adapted to display dichroism and/or a photochromic material. Non-limiting methods of forming at least partially aligned liquid crystal coatings, which may include materials adapted to display dichroism and/or photochromic materials, are described above.

Additionally, a liquid crystal coating may be applied to the compatiblizing coating without ordering at least a portion of the compatiblizing coating. Optionally, according to these non-limiting embodiments, during or after applying the liquid crystal coating, at least a portion of the liquid crystal coating may be at least partially ordered, for example, by exposing the liquid crystal coating to at least one of a magnetic field, an electric field, or a shear force. As discussed above, such ordered liquid crystal coatings may be used as alignment coatings for another coating, such as, for example, another liquid crystal coating. Further, such ordered liquid crystal coatings may be used without further modification, for example, to impart certain desired optical properties to the optical element (e.g., a desired refractive index), or the ordered liquid crystal coating can be used to align a material that is adapted to display dichroism. For example, as discussed above, liquid crystal coatings comprising an ordered liquid crystal material may be used to align a dichroic dye or a photochromic-dichroic dye to produce a polarizing coating or a photochromic-dichroic coating.

Further, although not required, one or more coatings, such as a transitional coating, a protective coating, and/or an anti-reflective coating, may also be formed on the optical elements. For example, as describe above with respect to FIG. 1, a transitional coating may be formed on at least a portion of the functional organic coating and a protective coating may be formed on at least a portion of the transitional coating. Although not limiting herein, where the functional organic coating is a photochromic coating and the protective coating is an abrasion-resistant hard coat, the transitional coating can provide a gradient in hardness between the relatively soft photochromic coating and the relative hard protective coating.

Various non-limiting embodiments of the present invention, or aspects thereof, are more particularly described in the following non-limiting examples. It should be appreciated that the following examples are intended merely as illustrative examples, as modification and variations thereof, which are within the spirit and scope of the present invention as set forth in the claims, will be apparent to those skilled in the art.

EXAMPLES

In Part 1 of the following examples, the materials and methods used to prepare the coated lenses with and without primer are described. In Part 2, the methods used for adhesion testing as well as the results reported in Table 1 are described.

Part 1—Lens Preparation

Seven pair of lens substrates each measuring 74 mm in diameter and having the base curvature listed in Table 1 were used. The test lenses were treated with a corona discharge for 15 seconds from a Tantec Corona unit operating at 60 Hertz and 1.3 kVA units. The test lenses were then washed in an automated process that scrubbed the surface with soapy water, rinsed with deionized water, and dried with air. Composition A was spin coated onto one of each pair of lenses to obtain a wet film weight of approximately 0.025 grams.

Composition A was prepared by mixing in the following order in the amounts listed as weight percent based on the total weight of the composition: 45.9 percent by weight of CN2302 reported to be a polyester acrylate oligomer obtained from Sartomer Corporation, Exton, Pa.; 13.8 percent by weight of EPON® 828 epoxy resin, reported to be a bisphenol A diglycidyl ether, obtained from Miller-Stephenson, Danbury, Conn.; 32.1 weight percent SILQUEST A-187® reported to be a gamma-glycidoxypropyl-trimethoxysilane, obtained from GE Silicones, Wilton, Conn.; and 8.3 weight percent of triarylsulfonium hexafluorophosphate salts mixed in 50 percent by weight propylene carbonate obtained from Sigma Aldrich, St. Louis, Mo.

The lenses coated with Composition A were placed approximately 8 inches (20.32 cm.) from lens to lamp, under a type "D" 400 watt/inch iron iodide doped mercury bulb having a length of 6 inches (15.24 cm) for 30 seconds until cured, These samples as well as the uncoated lenses were then coated with a solution of a photo-orientable polymer network available as ROLIC® ROP-108/CP obtained from Rolic Technologies, Ltd., Allschwil, Switzerland. The CP designation is reported to mean cyclopentanone. The coating solution was applied during the first spin speed of 612 RPM for 2 seconds. After coating application, the spin speed of each coated lens was increased to 1518 RPM for 12 seconds and then 1933 RPM for 2 seconds. The coated lenses were dried in a combination infrared/convection oven on a conveyor belt traveling 11 minutes through 5 zones having the following temperatures provide by IR and/or Convection Oven (CO) as indicated: Zone 1—175° C. (IR); Zone 2—175° C. (IR); Zone 3—155° C. (IR) and 150° C. (CO); Zone 4—150° C. (CO), and Zone 5—150° C. (CO); and cooled to room temperature.

After applying the photo-orientable polymer network to each of the test lenses, at least a portion of the photo-orientable polymer network was at least partially ordered by exposure for 35 seconds to linearly polarized ultraviolet light from the same type "D" bulb previously mentioned, which was filtered with a fused silica polarizer having a transmission axis parallel to the long side of the rectangular filter. The distance from lamp to lens was approximately 6 inches (15.24 cm). After ordering at least a portion of the photo-orientable polymer network, the lenses were cooled to room temperature.

Composition B was applied to the lenses by spin coating under conditions to reach a wet film weight of approximately 0.10 g. Composition B was prepared by mixing the materials in the following order: mixed 39.9 weight % anisole with 0.1 weight percent BYK® UV3530 surfactant obtained from BYK Chemie, USA, Wallingford, Conn.; heated and maintained at 65° C.; added 4.4 weight percent dichroic dyes formulated to yield a gray color; and mixed for 60 min. A liquid crystal monomer was added, 27.3 weight percent RM 105 liquid crystal monomer reported to have the molecular formula of $C_{23}H_{26}O_6$, which was obtained from EMD Chemicals, inc., Gibbstown, N.J., and the composition mixed for 30 min. Next, 27.2 weight percent RM 257 liquid crystal monomer reported to have the molecular formula of $C_{33}H_{32}O_{10}$ which was also obtained from EMD Chemicals, Inc., Gibbstown, N.J., was added and the composition mixed for 30 min. Next, 1.1 weight percent bis-(2,6-dimethoxybenzoyl)phenylphosphine oxide was added and the composition mixed for 30 min.

The coated lenses were placed on a conveyor belt heated using an Infrared heating system having five temperature zones as follows: 100° C.; 90° C.; 60° C.; 55° C.; and 55° C. The coated lenses traveled through the five zones in 5 minutes. The samples were then allowed to cool to room temperature before entering a UV conveyor curing line.

The UV conveyor curing line had a nitrogen atmosphere in which the oxygen level was less than 100 ppm. The conveyor traveled at 7.2 mm/sec beneath one ultraviolet "type D" 157.5 J/sec/inch (400 watt/inch) iron iodide doped mercury lamp of 25.4 cm (10 inches) in length. Lamp power was set to 94% and the lamp was positioned 20.3 cm (8.0 inches) above the conveyor. A converging funnel was placed beneath the lamp to direct light flow into a 15.24 cm×5.08 cm (6 inch×2 inch) area for lens exposure. A 300 nm filter was placed beneath the funnel to block out UV wavelength above 300 nm to the lenses. Each lens was exposed for 20 seconds under the UV lamp. The samples were then placed in a convection oven at 105° C. (221° F.) for 3 hours and 15 minutes.

Part 2—Adhesion Testing

Adhesion of the coating formed from Composition B on the test lenses with and without Composition A was determined by the crosshatch tape peel adhesion test known to those skilled in the art and described hereinafter. For each example test lens, the "A" lens was without Coating Composition A and the "B" lens was with Coating Composition A. In the primary test or dry test, a cutting tool composed of eleven X-acto® utility knife blades spaced approximately 1 mm apart (tip to tip) and 0.65 mm thick was used to make a first long cut, e.g., from the center of the lens to 3 mm from the edge of a 65 mm diameter lens, on the sample followed by second and third cuts, which were made at 90 degrees to and across the first cut. The second and third cuts were separated from each other to provide separate crosshatch zones. A piece of Scotch® 250 tape (3M, St. Paul, Minn.) 2.54 cm (1 inch) wide and long 5 to 6.3 cm (2 to 2.5 inches) was applied in the direction of the first cut and pressed down to smooth out any bubbles. Prior to testing, the tape was stored at 23° C.+/−5° C. with a relative humidity below 60%. The tape was then peeled off the surface with a sharp, rapid, even and continuous movement. This procedure was repeated with a fresh piece of tape. A smaller piece of tape, 3.8 cm (1.5 inches), was applied to each of the crosshatch zones produced by the second and third cuts in a direction 90 degrees to the direction of the first tape. The tape was peeled off in the same manner as before. The resulting lenses were inspected using a point source of light and loop/magnifying glass. The average of the percentage coating remaining from these 2 sites was determined and reported in Table 1 as the "Primary" adhesion test results. The samples were placed in boiling water for a period of 0.5 hour. After the samples were removed, dried, and cooled to room temp, the above procedure was repeated. The averaged results of this test were reported in Table 1 as the "Secondary" adhesion test results.

TABLE 1

| Lens Substrate | Base Curvature | % Primary Adhesion | % Secondary Adhesion |
|---|---|---|---|
| 1A[1] | 2.25 | 100 | 99 |
| 1B[1] | 2.25 | 100 | 100 |
| 2A[2] | 6.00 | 0 | 0 |
| 2B[2] | 6.00 | 100 | 100 |
| 3A[3] | 6.25 | 100 | 0 |
| 3B[3] | 6.25 | 100 | 100 |
| 4A[4] | 6.75 | 98 | 0 |
| 4B[4] | 6.75 | 100 | 100 |
| 5A[5] | 4.00 | 0 | 0 |
| 5B[5] | 4.00 | 95 | 95 |
| 6A[6] | 3.50 | 0 | 0 |
| 6B[6] | 3.50 | 50 | 50 |
| 7A[7] | 3.50 | 0 | 0 |
| 7B[7] | 3.50 | 100 | 100 |

[1] Uncoated lenses made from CR-607 monomer sold by PPG Industries, Inc, Pittsburgh, Pennsylvania.
[2] Uncoated lenses prepared by Younger Optics (Torrance, California) made of TRIVEX® monomer sold by PPG Industries, Inc., Pittsburgh, Pennsylvania.
[3] Hardcoated lenses prepared by Younger Optics (Torrance, California) made of polycarbonate monomer.
[4] Hardcoated lenses prepared by Gentex Optics, Inc., Dudley, Massachusetts, made of polycarbonate and designated as Poly GLC.
[5] Uncoated lenses prepared by Essilor of America, Dallas, Texas, and designated MR8.
[6] Lenses prepared by Seiko Optical Products, Mahwah, New Jersey, and designated uncoated MR10.
[7] Lenses prepared by Seiko Optical Products, Mahwah, New Jersey, and designated hardcoated MR10.

As previously discussed, while the present invention is described herein connection with certain embodiments and examples, the present invention is not limited to the particular embodiments and examples disclosed, but is intended to cover modifications that are within the spirit and scope of the invention, as defined by the appended claims. Further, it is to be understood that the present description illustrates aspects of the invention relevant to a clear understanding of the invention. Accordingly, certain aspects of the invention that would be apparent to those of ordinary skill in the art and that, therefore, would not facilitate a better understanding of the invention have not been presented in order to simplify the present description.

What is claimed is:

1. An optical element comprising:
   (a) a substrate;
   (b) a compatiblizing coating comprising a dendritic polymer on at least a portion of a surface of the substrate; and
   (c) a functional organic coating, other than an abrasion-resistant coating, in contact with at least a portion of the compatiblizing coating opposite the substrate, the functional organic coating being at least one of an alignment coating and a liquid crystal coating.

2. The optical element of claim 1, wherein the dendritic polymer is at least one of a polyester-polyether blended dendritic polymer, a hyperbranched polyester oligomer, a hyperbranched polyester acrylate oligomer, an epoxide-amine dendritic polymer, a carbosilane-based dendritic polymer, an amido amine dendritic polymer, a polysulfide dendritic polymer, a polysiloxane dendritic polymer, a polyaminosulfide dendritic polymer, a polyether dendritic polymer, a polythioether dendritic polymer, a polyester dendritic polymer, a polyester amide dendritic polymer, and a poly(ether ketone) dendritic polymer.

3. The optical element of claim 1, wherein the compatiblizing coating is formed from a compatiblizing coating composition comprising a dendritic polymer comprising a terminal functional group, wherein the terminal functional group is at least one of hydroxyl, (meth)acrylate, acid, isocyano, thiol, amine, epoxy, silane, and glycidyl.

4. The optical element of claim 3, wherein the compatiblizing coating composition further comprises at least one of:

(a) an epoxy-containing material comprising at least two reactive functional groups at least one of which is an epoxy group;
(b) an isocyanate-containing material comprising at least two reactive functional groups at least one of which is an isocyanate group;
(c) a (meth)acrylate-containing material comprising at least two reactive functional groups at least one of which is a (meth)acrylate group; and
(d) an aminoplast resin comprising at least two reactive functional groups.

5. The optical element of claim 4, wherein the compatiblizing coating composition further comprises at least one of: a coupling agent, an at least partial hydrolysate thereof, or a mixture thereof; an initiator; a catalyst; a polymerization inhibitor; a solvent; a light stabilizer; a heat stabilizer; a mold release agent; a rheology control agent; a leveling agent; and a free radical scavenger.

6. The optical element of claim 4, wherein the compatiblizing coating composition comprises:
(a) a dendritic polymer comprising a terminal (meth)acrylate group;
(b) an epoxy-containing material comprising at least two epoxy groups;
(c) an aminoplast resin comprising at least two reactive functional groups;
(d) a silane coupling agent, an at least partial hydrolysate thereof, or a mixture thereof; and
(e) a photoinitiator initiator.

7. The optical element of claim 4, wherein the compatiblizing coating composition comprises:
(a) a dendritic polymer comprising a terminal (meth)acrylate group;
(b) an isocyanate-containing material comprising at least two isocyanate groups;
(c) an aminoplast resin comprising at least two reactive functional groups;
(d) a silane coupling agent, an at least partial hydrolysate thereof, or a mixture thereof;
(e) a photoinitiator initiator; and
(f) an organo-tin catalyst.

8. The optical element of claim 1, wherein the compatiblizing coating is essentially free of photochromic materials.

9. The optical element of claim 1, wherein the optical element comprises:
(a) a substrate comprising an abrasion-resistant coating in contact with at least a portion of a surface thereof;
(b) a compatiblizing coating comprising a dendritic polymer in contact with at least a portion of the abrasion-resistant coating;
(c) a functional organic coating in contact with at least a portion of the compatiblizing coating, the functional organic coating being at least one of an alignment coating and a liquid crystal coating; and
(d) at least one of a transitional coating, an abrasion resistant coating, and an anti-reflective coating on at least a portion of the functional organic coating.

10. A method of making an optical element comprising:
(a) forming a compatiblizing coating comprising a dendritic polymer on at least a portion of a surface of a substrate; and
(b) forming a functional organic coating, other than an abrasion resistant coating, on at least a portion of the compatiblizing coating such that the functional organic coating is in contact with at least a portion of the compatiblizing coating opposite the surface of the substrate, the functional organic coating being at least one of an alignment coating and a liquid crystal coating.

11. The method of claim 10, wherein the functional organic coating is at least one of an alignment coating and a liquid crystal coating.

12. The method of claim 10, wherein prior to forming the functional organic coating on at least a portion of the compatiblizing coating, at least a portion of the compatiblizing coating is at least partially ordered by rubbing or texturing at least a portion of the compatiblizing coating after at least partially setting the portion of the compatiblizing coating.

13. The method of claim 12, wherein the functional organic coating is a liquid crystal coating comprising an at least partially aligned liquid crystal material and wherein forming the functional organic coating comprises:
(a) applying a coating composition comprising a liquid crystal material on at least a portion of the at least partially ordered portion of the compatiblizing coating;
(b) at least partially aligning at least a portion of the liquid crystal material with at least a portion of the at least partially ordered portion of the compatiblizing coating; and
(c) at least partially setting at least a portion of the liquid crystal material.

14. An optical element comprising:
(a) a substrate;
(b) a compatiblizing coating derived from the compatiblizing coating composition on at least a portion of a surface of the substrate, the compatibilizing coating composition comprising:
a dendritic polymer comprising a terminal functional group;
an epoxy-containing material comprising at least two reactive functional groups, at least one of which is an epoxy group;
an aminoplast resin comprising at least two reactive functional groups;
a coupling agent, an at least partial hydrolysate thereof, or a mixture thereof; and
an initiator,
wherein the compatiblizing coating composition is essentially free of photochromic materials; and
(c) a functional organic coating on at least a portion of the compatiblizing coating, the functional organic coating being at least one of an alignment coating and a liquid crystal coating.

15. A method of forming an ophthalmic element comprising:
(a) forming a compatiblizing coating derived from the compatiblizing coating composition on at least a portion of a surface of a substrate, the compatibilizing coating composition comprising:
a dendritic polymer comprising a terminal functional group;
an epoxy-containing material comprising at least two reactive functional groups, at least one of which is an epoxy group;
an aminoplast resin comprising functional groups;
a coupling agent an at least partial hydrolysate thereof, or a mixture thereof; and
an initiator,
wherein the compatiblizing coating composition is essentially free of photochromic materials; and
(b) forming a functional organic coating on at least a portion of the compatiblizing coating, the functional organic coating being at least one of an alignment coating and a liquid crystal coating.

16. The method of claim 15, wherein prior to forming the functional coating on at least a portion of the compatiblizing coating, at least a portion of the compatiblizing coating is at least partially ordered by rubbing or texturing at least a portion of the compatiblizing coating after at least partially setting the portion of the compatiblizing coating composition.

17. An ophthalmic element comprising:
  (a) an ophthalmic substrate;
  (b) a compatiblizing coating that is essentially free of photochromic materials on at least a portion of a surface of the ophthalmic substrate, the compatiblizing coating being formed from a compatiblizing coating composition comprising:
    (i) an isocyanate-containing material comprising at least two isocyanate groups;
    (ii) a (meth)acrylate-containing material comprising at least two reactive functional groups, at least one of which is a (meth)acrylate group;
    (iii) an aminoplast resin comprising at least two reactive functional groups;
    (iv) a coupling agent, an at least partial hydrolysate thereof, or a mixture thereof; and
    (v) at least one of an initiator and a catalyst; and
  (c) a functional organic coating, other than an abrasion-resistant coating, in contact with at least a portion of the compatiblizing coating opposite the ophthalmic substrate, the functional organic coating being at least one of an alignment coating and a liquid crystal coating.

18. The ophthalmic element of claim 17, wherein the compatiblizing coating composition comprises:
  (a) an isocyanate-containing material comprising at least two isocyanate groups;
  (b) a (meth)acrylate-containing material comprising at least two (meth)acrylate groups;
  (c) an aminoplast resin comprising at least two reactive functional groups;
  (d) a coupling agent, an at least partial hydrolysate thereof, or a mixture thereof;
  (e) a photoinitiator; and
  (f) an organo-tin catalyst.

19. The ophthalmic element of claim 18, wherein the (meth)acrylate-containing material is a dendritic polymer.

20. A method of forming an ophthalmic element comprising:
  (a) forming a compatiblizing coating that is essentially free of photochromic materials on at least a portion of a surface of an ophthalmic substrate, wherein the compatiblizing coating is derived from a compatiblizing coating composition comprising:
    (i) an isocyanate-containing material comprising at least two isocyanate groups;
    (ii) a (meth)acrylate-containing material comprising at least two reactive functional groups, at least one of which is a (meth)acrylate group;
    (iii) an aminoplast resin comprising at least two reactive functional groups;
    (iv) a coupling agent, an at least partial hydrolysate thereof, or a mixture thereof; and
    (v) at least one of an initiator and a catalyst;
  (b) at least partially setting at least a portion of the compatiblizing coating by exposing the portion to at least one of UV radiation, electron beam radiation, and thermal radiation; and
  (c) forming a functional organic coating, other than a hard coating, on at least a portion of the compatiblizing coating, the functional organic coating being at least one of an alignment coating and a liquid crystal coating.

21. The method of claim 20, wherein prior to forming the functional coating on at least a portion of the compatiblizing coating, at least a portion of the compatiblizing coating is at least partially ordered by rubbing the portion of the compatiblizing coating.

22. The method of claim 21, wherein the functional organic coating is a liquid crystal coating comprising an at least partially aligned liquid crystal material, and wherein forming the functional organic coating on at least a portion of the compatiblizing coating comprises:
  (a) applying a coating composition comprising a liquid crystal material on at least a portion of the ordered portion of the compatiblizing coating; and
  (b) at least partially aligning at least a portion of the liquid crystal material with the ordered portion of the compatiblizing coating.

* * * * *